US012732768B2

(12) United States Patent
Hu et al.

(10) Patent No.: US 12,732,768 B2
(45) Date of Patent: Sep. 8, 2026

(54) SOUND IMAGE CALIBRATION METHOD AND APPARATUS

(71) Applicant: Honor Device Co., Ltd., Shenzhen (CN)

(72) Inventors: Beibei Hu, Shenzhen (CN); Huaming Chen, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 195 days.

(21) Appl. No.: 18/836,580

(22) PCT Filed: Jun. 27, 2023

(86) PCT No.: PCT/CN2023/102783

§ 371 (c)(1),
(2) Date: Aug. 7, 2024

(87) PCT Pub. No.: WO2024/037189

PCT Pub. Date: Feb. 22, 2024

(65) Prior Publication Data

US 2026/0181343 A1 Jun. 25, 2026

(30) Foreign Application Priority Data

Aug. 15, 2022 (CN) ......................... 202210977326.4

(51) Int. Cl.
*H04S 7/00* (2006.01)

(52) U.S. Cl.
CPC ........... *H04S 7/301* (2013.01); *H04S 2400/11* (2013.01); *H04S 2400/13* (2013.01); *H04S 2420/01* (2013.01)

(58) Field of Classification Search
CPC .. H04S 7/301; H04S 2400/11; H04S 2400/13; H04S 2420/01
See application file for complete search history.

(56) References Cited

U.S. PATENT DOCUMENTS 7,031,474 B1 4/2006 Yuen et al.
12,538,012 B2 * 1/2026 Liu ........................ H04N 5/772
(Continued)

FOREIGN PATENT DOCUMENTS

CN 101938686 A 1/2011
CN 107547987 A 1/2018
(Continued)

*Primary Examiner* — David L Ton
(74) *Attorney, Agent, or Firm* — WOMBLE BOND DICKINSON (US) LLP

(57) ABSTRACT

Embodiments of this application provide a sound image calibration method and apparatus. The method includes: A terminal device outputs a first target audio signal using a first play component, and a second target audio signal using a second play component, where a sound image is located at a first location. The terminal device receives a second operation on a second control; in response, it outputs a third target audio signal using the first play component, and a fourth target audio signal using the second play component, where the sound image is located at a second location. The distance between the second location and the central location of the terminal device is less than the distance between the first location and the central location. This allows the terminal device to turn on the control for sound image calibration, adjust the sound image closer to the central location, improve audio replay effect.

20 Claims, 18 Drawing Sheets

(56) References Cited

U.S. PATENT DOCUMENTS

| | | | | |
|---|---|---|---|---|
| 12,587,805 | B2 * | 3/2026 | Cao | H04S 7/303 |
| 2012/0033530 | A1 | 2/2012 | Enamito et al. | |
| 2018/0139564 | A1 * | 5/2018 | Lim | H04R 3/04 |
| 2019/0158957 | A1 | 5/2019 | Breebaart et al. | |
| 2020/0196089 | A1 | 6/2020 | Sapozhnykov | |
| 2025/0056179 | A1 * | 2/2025 | Sun | H04R 5/02 |

FOREIGN PATENT DOCUMENTS

| | | | | |
|---|---|---|---|---|
| CN | 109413563 | A | 3/2019 | |
| CN | 109803218 | A | 5/2019 | |
| CN | 110133663 | A | 8/2019 | |
| CN | 112165648 | A | 1/2021 | |
| CN | 113596647 | A | 11/2021 | |
| CN | 113794965 | A | 12/2021 | |
| CN | 114040319 | A | 2/2022 | |
| CN | 114390426 | A | 4/2022 | |
| CN | 115696172 | A | 2/2023 | |
| EP | 3487188 | A1 | 5/2019 | |
| EP | 4664900 | A1 * | 12/2025 | H04N 21/4394 |
| JP | 2005295382 | A | 10/2005 | |
| JP | 2008160265 | A | 7/2008 | |

* cited by examiner

CONT. FROM FIG. 7A

CONT. FROM FIG. 9A

SOUND IMAGE CALIBRATION METHOD AND APPARATUS

CROSS-REFERENCE TO RELATED APPLICATIONS

This application is a national stage of International Application No. PCT/CN2023/102783, filed on Jun. 27, 2023, which claims priority to Chinese Patent Application No. 202210977326.4, filed on Aug. 15, 2022. The disclosures of both of the aforementioned applications are hereby incorporated by reference in their entireties.

TECHNICAL FIELD

This application relates to the field of terminal technologies, and in particular, to a sound image calibration method and apparatus.

BACKGROUND

With popularization and development of the Internet, people have increasingly diversified requirements on functions of terminal devices. For example, a user has an increasingly high requirement on sound replay of the terminal device.

Generally, the terminal device may include at least two play components, so that the terminal device may implement sound replay by using the at least two play components.

However, a sound image corresponding to audio replayed by the at least two play components deviates from a central location, resulting in a relatively poor audio replay effect. For example, when the terminal device plays any video, a sound image of the video is located at a central location of the terminal device, but the user may indicate, based on a received audio signal, that the sound image is located at a lower left corner of the terminal device or another location that deviates from a center.

SUMMARY

Embodiments of this application provide a sound image calibration method and apparatus, so that a terminal device can calibrate a sound image based on a trigger operation performed by a user on a control for enabling sound image calibration, and adjust the sound image to be close to a central location of the terminal device, to improve an audio replay effect, and extend a sound field.

According to a first aspect, an embodiment of this application provides a sound image calibration method, applied to a terminal device. The terminal device includes a first play component and a second play component. The method includes: The terminal device displays a first interface, where the first interface includes a first control used to play a target video; the terminal device receives a first operation performed on the first control; in response to the first operation, the terminal device displays a second interface, and the terminal device outputs a first target audio signal by using the first play component, and outputs a second target audio signal by using the second play component, where a sound image is located at a first location when the first target audio signal and the second target audio signal are played, and the second interface includes a second control used to enable sound image calibration; the terminal device receives a second operation performed on the second control; and the terminal device outputs, in response to the second operation, a third target audio signal by using the first play component, and outputs a fourth target audio signal by using the second play component, where the sound image is located at a second location when the third target audio signal and the fourth target audio signal are played, and a distance between the second location and a central location of the terminal device is less than a distance between the first location and the central location. In this way, the terminal device can calibrate the sound image based on a trigger operation performed by a user on the control for enabling sound image calibration, and adjust the sound image to be close to the central location of the terminal device, to improve an audio replay effect, and extend a sound field.

In a possible implementation, that the terminal device outputs, in response to the second operation, a third target audio signal by using the first play component, and outputs a fourth target audio signal by using the second play component includes: In response to the second operation, the terminal device corrects a first frequency response of the first play component to obtain a third frequency response, and corrects a second frequency response of the second play component to obtain a fourth frequency response, where an amplitude corresponding to a preset frequency band in the third frequency response meets a preset amplitude range, and an amplitude corresponding to the preset frequency band in the fourth frequency response meets the preset amplitude range; and the terminal device outputs the third target audio signal by using the third frequency response, and outputs the fourth target audio signal by using the fourth frequency response. In this way, the terminal device can correct the frequency response on the preset frequency band, so that a speaker after frequency response correction can output an audio signal that better meets a user requirement.

In a possible implementation, that the terminal device corrects a first frequency response of the first play component to obtain a third frequency response, and corrects a second frequency response of the second play component to obtain a fourth frequency response includes: The terminal device obtains a first frequency response compensation function corresponding to the first frequency response and a second frequency response compensation function corresponding to the second frequency response; and the terminal device corrects the first frequency response on the preset frequency band by using the first frequency response compensation function, to obtain the third frequency response, and corrects the second frequency response on the preset frequency band by using the second frequency response compensation function, to obtain the fourth frequency response. In this way, the terminal device can correct the frequency response by using the frequency response compensation function, so that an amplitude of the frequency response of the play component is flat, and frequency response trends of a plurality of play components are close to each other, to resolve a problem that is of deviation of the sound image from a center and that is caused by inconsistent frequency responses.

In a possible implementation, the preset frequency band is a frequency band greater than a target cutoff frequency in a full frequency band; or the preset frequency band is a same frequency band between a first frequency band and a second frequency band, the first frequency band is a frequency band corresponding to a case in which a change rate of an interaural level difference ILD meets a first target range, and the second frequency band is a frequency band corresponding to a case in which a change rate of a sound pressure level SPL meets a second target range. In this way, the terminal device can process the frequency response on the preset frequency band, to reduce complexity of an algorithm, so that a speaker after frequency response correction can output an audio signal that better meets a user requirement.

In a possible implementation, that the preset frequency band is a frequency band greater than a target cutoff frequency in a full frequency band includes: When the first play component or the second play component includes a target component, the preset frequency band is a frequency band greater than the target cutoff frequency in the full frequency band, where the target cutoff frequency is a cutoff frequency of the target component; or that the preset frequency band is a same frequency band between a first frequency band and a second frequency band includes: When the first play component or the second play component does not include a target component, the preset frequency band is a same frequency band between the first frequency band and the second frequency band.

In a possible implementation, that the terminal device outputs the third target audio signal by using the third frequency response, and outputs the fourth target audio signal by using the fourth frequency response includes: The terminal device outputs a fifth target audio signal by using the third frequency response, and outputs a sixth target audio signal by using the fourth frequency response; on a target frequency band, the terminal device obtains a first playback signal corresponding to a first sweep signal by using the third frequency response, and obtains a second playback signal corresponding to the first sweep signal by using the fourth frequency response, where the target frequency band is a frequency band on which a similarity between the third frequency response and the fourth frequency response is greater than a preset threshold, the first sweep signal has a same amplitude, and a frequency band of the first sweep signal meets the target frequency band; and the terminal device processes the fifth target audio signal and/or the sixth target audio signal based on a difference between the first playback signal and the second playback signal, to obtain the third target audio signal and the fourth target audio signal. In this way, the terminal device can process the fifth target audio signal and/or the sixth target audio signal by using the difference between the first playback signal and the second playback signal, to adjust the sound image in a vertical direction.

In a possible implementation, that the terminal device processes the fifth target audio signal and/or the sixth target audio signal based on a difference between the first playback signal and the second playback signal, to obtain the third target audio signal and the fourth target audio signal includes: The terminal device processes the fifth target audio signal and/or the sixth target audio signal based on the difference between the first playback signal and the second playback signal, to obtain a seventh target audio signal and an eighth target audio signal; and the terminal device processes the seventh target audio signal by using a first HRTF in a target head-related transfer function HRTF, to obtain the third target audio signal, and processes the eighth target audio signal by using a second HRTF in the HRTF, to obtain the fourth target audio signal. In this way, the terminal device can simulate a pair of virtual speakers by using an HRTF-based virtual speaker method, so that when the pair of virtual speakers outputs an audio signal, the sound image can be located at a center point location of the terminal device, to extend a width of the sound field, so as to horizontally adjust the sound image.

In a possible implementation, the second interface further includes a progress bar used to adjust a sound field, any location in the progress bar corresponds to a group of HRTFs, and the method further includes: The terminal device receives a third operation of sliding the progress bar used to adjust a sound field; and that the terminal device processes the seventh target audio signal by using a first HRTF in a target head-related transfer function HRTF, to obtain the third target audio signal, and processes the eighth target audio signal by using a second HRTF in the HRTF, to obtain the fourth target audio signal includes: In response to the third operation, the terminal device obtains the target HRTF corresponding to a location of the third operation, processes the seventh target audio signal by using the first HRTF in the target HRTF, to obtain the third target audio signal, and processes the eighth target audio signal by using the second HRTF in the HRTF, to obtain the fourth target audio signal. In this way, the terminal device can provide a sound field adjustment manner for the user, to improve experience of replaying a video by the user.

In a possible implementation, that the terminal device processes the seventh target audio signal by using a first HRTF in a target head-related transfer function HRTF, to obtain the third target audio signal, and processes the eighth target audio signal by using a second HRTF in the HRTF, to obtain the fourth target audio signal includes: The terminal device processes the seventh target audio signal by using the first HRTF, to obtain a ninth target audio signal, and processes the eighth target audio signal by using the second HRTF, to obtain a tenth target audio signal; and the terminal device performs tone processing on the ninth target audio signal by using a target filtering parameter, to obtain the third target audio signal, and performs tone processing on the tenth target audio signal by using the target filtering parameter, to obtain the fourth target audio signal. In this way, after correction of the speaker and rendering of the virtual speaker, a tone of the audio signal may be changed. Therefore, the terminal device can adjust the tone by using the target filtering parameter, to improve the tone of the audio, so as to improve sound quality of the audio.

In a possible implementation, there is a control used to adjust a tone, and the method further includes: The terminal device receives a fourth operation performed on the control used to adjust a tone; the terminal device displays a third interface in response to the fourth operation, where the third interface includes a plurality of tone controls used to select a tone, and any tone control corresponds to a group of filtering parameters; the terminal device receives a fifth operation performed on a target tone control in the plurality of tone controls; and in response to the fifth operation, the terminal device performs tone processing on the ninth target audio signal by using the target filtering parameter corresponding to the target tone control, to obtain the third target audio signal, and performs tone processing on the tenth target audio signal by using the target filtering parameter, to obtain the fourth target audio signal. In this way, the terminal device can provide a tone adjustment manner for the user, to improve experience of replaying a video by the user.

In a possible implementation, that the terminal device performs tone processing on the ninth target audio signal by using a target filtering parameter, to obtain the third target audio signal, and performs tone processing on the tenth target audio signal by using the target filtering parameter, to obtain the fourth target audio signal includes: The terminal device performs tone processing on the ninth target audio signal by using the target filtering parameter, to obtain an eleventh target audio signal, and performs tone processing on the tenth target audio signal by using the target filtering parameter, to obtain a twelfth target audio signal; and the terminal device performs volume adjustment on the eleventh target audio signal based on a gain change between an initial audio signal corresponding to the first play component and an initial audio signal corresponding to the second play component and a gain change between the eleventh target audio signal and the twelfth target audio signal, to obtain the third target audio signal, and the terminal device performs volume adjustment on the twelfth target audio signal based on the gain change between the initial audio signal corresponding to the first play component and the initial audio signal corresponding to the second play component and the gain change between the eleventh target audio signal and the twelfth target audio signal, to obtain the fourth target audio signal. In this way, the terminal device can adjust volume of the audio signal, so that the volume of the output dual-channel audio signal better meets user experience.

According to a second aspect, an embodiment of this application provides a sound image calibration apparatus. A terminal device includes a first play component and a second play component. A display unit is configured to display a first interface, where the first interface includes a first control used to play a target video. A processing unit is configured to receive a first operation performed on the first control. In response to the first operation, the display unit is configured to display a second interface, and the processing unit is further configured to: output a first target audio signal by using the first play component, and output a second target audio signal by using the second play component, where a sound image is located at a first location when the first target audio signal and the second target audio signal are played, and the second interface includes a second control used to enable sound image calibration. The processing unit is further configured to receive a second operation performed on the second control. In response to the second operation, the processing unit is further configured to: output a third target audio signal by using the first play component, and output a fourth target audio signal by using the second play component, where the sound image is located at a second location when the third target audio signal and the fourth target audio signal are played, and a distance between the second location and a central location of the terminal device is less than a distance between the first location and the central location.

In a possible implementation, in response to the second operation, the processing unit is further configured to: correct a first frequency response of the first play component to obtain a third frequency response, and correct a second frequency response of the second play component to obtain a fourth frequency response, where an amplitude corresponding to a frequency band in the third frequency response meets a preset amplitude range, and an amplitude corresponding to the preset frequency band in the fourth frequency response meets the preset amplitude range; and the processing unit is further configured to: output the third target audio signal by using the third frequency response, and output the fourth target audio signal by using the fourth frequency response.

In a possible implementation, the processing unit is further configured to obtain a first frequency response compensation function corresponding to the first frequency response and a second frequency response compensation function corresponding to the second frequency response; and the processing unit is further configured to: correct the first frequency response on the preset frequency band by using the first frequency response compensation function, to obtain the third frequency response, and correct the second frequency response on the preset frequency band by using the second frequency response compensation function, to obtain the fourth frequency response.

In a possible implementation, the preset frequency band is a frequency band greater than a target cutoff frequency in a full frequency band; or the preset frequency band is a same frequency band between a first frequency band and a second frequency band, the first frequency band is a frequency band corresponding to a case in which a change rate of an interaural level difference ILD meets a first target range, and the second frequency band is a frequency band corresponding to a case in which a change rate of a sound pressure level SPL meets a second target range.

In a possible implementation, that the preset frequency band is a frequency band greater than a target cutoff frequency in a full frequency band includes: when the first play component or the second play component includes a target component, the preset frequency band is a frequency band greater than the target cutoff frequency in the full frequency band, where the target cutoff frequency is a cutoff frequency of the target component; or that the preset frequency band is a same frequency band between a first frequency band and a second frequency band includes: when the first play component or the second play component does not include a target component, the preset frequency band is a same frequency band between the first frequency band and the second frequency band.

In a possible implementation, the processing unit is further configured to: output a fifth target audio signal by using the third frequency response, and output a sixth target audio signal by using the fourth frequency response; on a target frequency band, the processing unit is further configured to: obtain a first playback signal corresponding to a first sweep signal by using the third frequency response, and obtain a second playback signal corresponding to the first sweep signal by using the fourth frequency response, where the target frequency band is a frequency band on which a similarity between the third frequency response and the fourth frequency response is greater than a preset threshold, the first sweep signal has a same amplitude, and a frequency band of the first sweep signal meets the target frequency band; and the processing unit is further configured to process the fifth target audio signal and/or the sixth target audio signal based on a difference between the first playback signal and the second playback signal, to obtain the third target audio signal and the fourth target audio signal.

In a possible implementation, the processing unit is further configured to process the fifth target audio signal and/or the sixth target audio signal based on the difference between the first playback signal and the second playback signal, to obtain a seventh target audio signal and an eighth target audio signal; and the processing unit is further configured to: process the seventh target audio signal by using a first HRTF in a target head-related transfer function HRTF, to obtain the third target audio signal, and process the eighth target audio signal by using a second HRTF in the HRTF, to obtain the fourth target audio signal.

In a possible implementation, the second interface further includes a progress bar used to adjust a sound field, any location in the progress bar corresponds to a group of HRTFs, and the processing unit is further configured to receive a third operation of sliding the progress bar used to adjust a sound field; and in response to the third operation, the processing unit is further configured to: obtain the target HRTF corresponding to a location of the third operation, process the seventh target audio signal by using the first HRTF in the target HRTF, to obtain the third target audio signal, and process the eighth target audio signal by using the second HRTF in the HRTF, to obtain the fourth target audio signal.

In a possible implementation, the processing unit is further configured to: process the seventh target audio signal by using the first HRTF, to obtain a ninth target audio signal, and process the eighth target audio signal by using the second HRTF, to obtain a tenth target audio signal; and the processing unit is further configured to: perform tone processing on the ninth target audio signal by using a target filtering parameter, to obtain the third target audio signal, and perform tone processing on the tenth target audio signal by using the target filtering parameter, to obtain the fourth target audio signal.

In a possible implementation, there is a control used to adjust a tone, and the processing unit is further configured to receive a fourth operation performed on the control used to adjust a tone; the display unit is configured to display a third interface in response to the fourth operation, where the third interface includes a plurality of tone controls used to select a tone, and any tone control corresponds to a group of filtering parameters; the processing unit is further configured to receive a fifth operation performed on a target tone control in the plurality of tone controls; and in response to the fifth operation, the processing unit is further configured to: perform tone processing on the ninth target audio signal by using the target filtering parameter corresponding to the target tone control, to obtain the third target audio signal, and perform tone processing on the tenth target audio signal by using the target filtering parameter, to obtain the fourth target audio signal.

In a possible implementation, the processing unit is further configured to: perform tone processing on the ninth target audio signal by using the target filtering parameter, to obtain an eleventh target audio signal, and perform tone processing on the tenth target audio signal by using the target filtering parameter, to obtain a twelfth target audio signal; and the processing unit is further configured to perform volume adjustment on the eleventh target audio signal based on a gain change between an initial audio signal corresponding to the first play component and an initial audio signal corresponding to the second play component and a gain change between the eleventh target audio signal and the twelfth target audio signal, to obtain the third target audio signal, and the processing unit is further configured to perform volume adjustment on the twelfth target audio signal based on the gain change between the initial audio signal corresponding to the first play component and the initial audio signal corresponding to the second play component and the gain change between the eleventh target audio signal and the twelfth target audio signal, to obtain the fourth target audio signal.

According to a third aspect, an embodiment of this application provides a terminal device, including a memory, a processor, and a computer program stored in the memory and capable of running on the processor. When the processor executes the computer program, the terminal device is enabled to perform the sound image calibration method according to any one of the first aspect or the implementations of the first aspect.

According to a fourth aspect, an embodiment of this application provides a computer-readable storage medium. The computer-readable storage medium stores instructions, and when the instructions are executed, a computer is enabled to perform the sound image calibration method according to any one of the first aspect or the implementations of the first aspect.

According to a fifth aspect, a computer program product is provided, and includes a computer program. When the computer program is run, a computer is enabled to perform the sound image calibration method according to any one of the first aspect or the implementations of the first aspect.

It should be understood that the technical solutions of the second aspect to the fifth aspect of this application correspond to the technical solutions of the first aspect of this application, and beneficial effects achieved by the aspects and corresponding feasible implementations are similar. Details are not described herein again.

DESCRIPTION OF EMBODIMENTS

Figure 1:
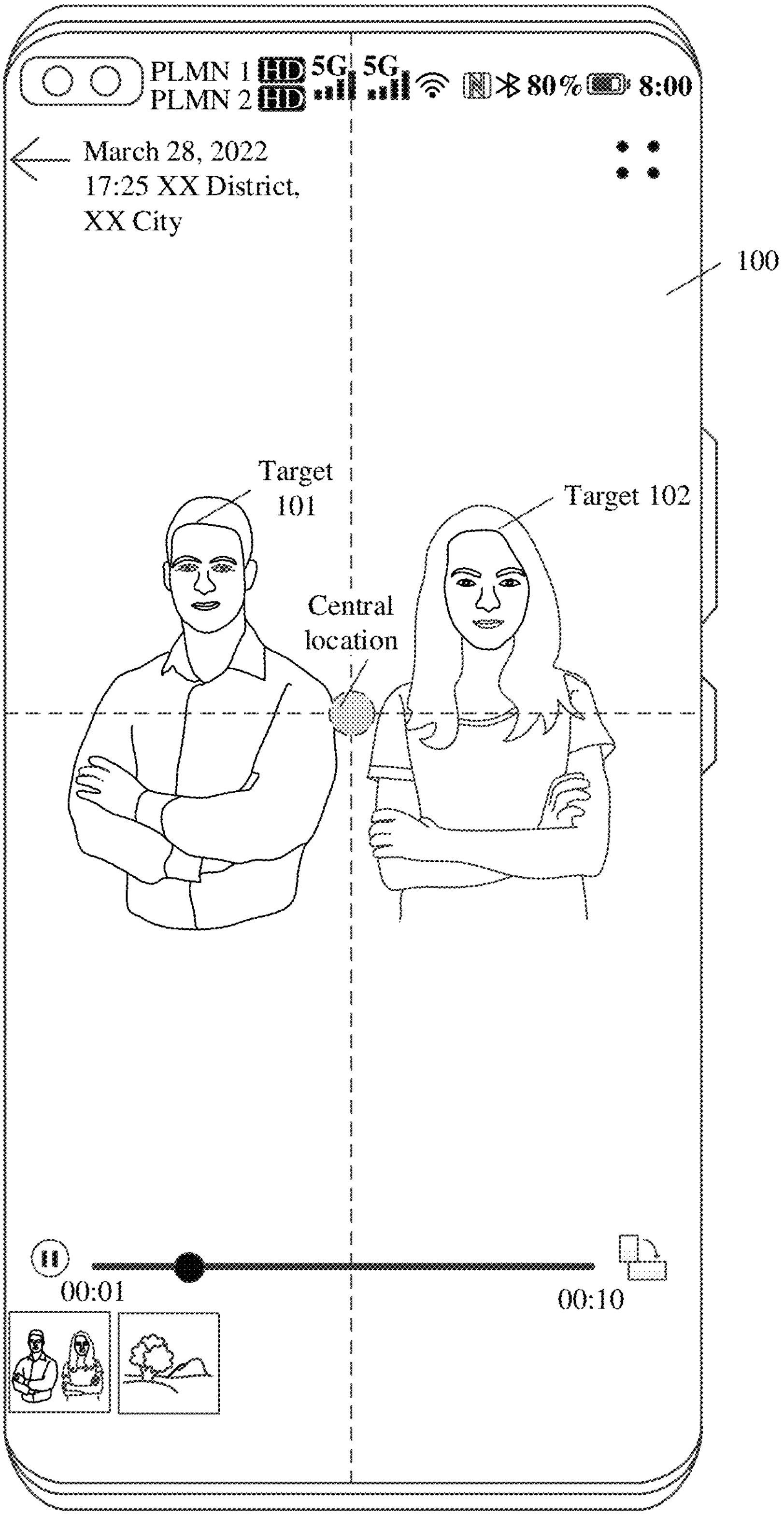
FIG. 1 is a schematic diagram of a scenario according to an embodiment of this application.

To clearly describe the technical solutions in the embodiments of this application, in the embodiments of this application, words such as “first” and “second” are used to distinguish between same items or similar items with basically the same functions and effects. For example, a first value and a second value are merely used to distinguish between different values, but not used to limit a sequence thereof. A person skilled in the art may understand that the words such as “first” and “second” do not limit a quantity and an execution sequence, and the words such as "first" and "second" do not indicate a definite difference.

It should be noted that in this application, the word such as "example" or "for example" is used to represent giving an example, an illustration, or a description. Any embodiment or design solution described as an "example" or "for example" in this application should not be explained as being more preferred or having more advantages than other embodiments or design solutions. Exactly, the word such as "example" or "for example" is used to present related concepts in a specific manner.

In this application, "at least one" means one or more, and "a plurality of" means two or more. "And/Or" describes an association relationship between associated objects, and represents that three relationships may exist. For example, "A and/or B" may represent the following cases: Only A exists, both A and B exist, and only B exists, where A and B may be singular or plural. The character "/" usually indicates an "or" relationship between associated objects. "At least one of the following items" or a similar expression thereof means any combination of these items, including a single item or any combination of a plurality of items. For example, at least one of a, b, or c may represent a, b, c, a and b, a and c, b and c, or a, b, and c, where a, b, and c may be singular or plural.

The following describes terms used in the embodiments of this application. It may be understood that the descriptions are intended to explain the embodiments of this application more clearly, and do not necessarily constitute a limitation on the embodiments of this application.

(1) Frequency Response

The frequency response may also be referred to as a frequency response, and is used to describe a difference in a processing capability of an instrument for signals at different frequencies. Generally, the frequency response of the instrument may be determined by using a frequency response curve. In the frequency response curve, a horizontal axis may be a frequency (Hz), and a vertical axis may be loudness (or a sound pressure level, an amplitude, or the like) (dB). This may be understood as that the frequency response curve may represent maximum loudness of a sound at any frequency.

(2) Sound Image

The sound image may be understood as a sound generation location of a sound source in a sound field, or may be understood as a direction of a sound. For example, a terminal device may determine a sound image location based on sound generation of a play component. For example, when the terminal device determines that loudness of a first play component is greater than loudness of a second play component, the terminal device may determine that the sound image location may be close to the first play component. The sound field may be understood as an area in which a sound wave exists in a medium.

For example, FIG. 1 is a schematic diagram of a scenario according to an embodiment of this application. In the embodiment corresponding to FIG. 1, an example in which a terminal device is a mobile phone is used for description. This example does not constitute a limitation on this embodiment of this application.

When the terminal device plays any video in a speaker mode by using at least two play components, the terminal device may display an interface shown in FIG. 1. As shown in FIG. 1, the interface may include a video 100, video shooting information, a control used to exit video viewing, a control, at an upper right corner of the interface, used to view more video information, a pause control, a progress bar used to indicate video progress, a control used to perform switching between a landscape mode and a portrait mode, a thumbnail corresponding to the video 100, a thumbnail corresponding to another video, and the like. The video 100 may include a target 101 that is talking and a target 102 that is talking, and the target 101 and the target 102 may be located at a central location of the terminal device.

The terminal device may include at least two play components, and the play component may be a speaker and/or a receiver. The at least two play components may be asymmetrically disposed, and/or the at least two play components may be of different types.

Figure 2A:
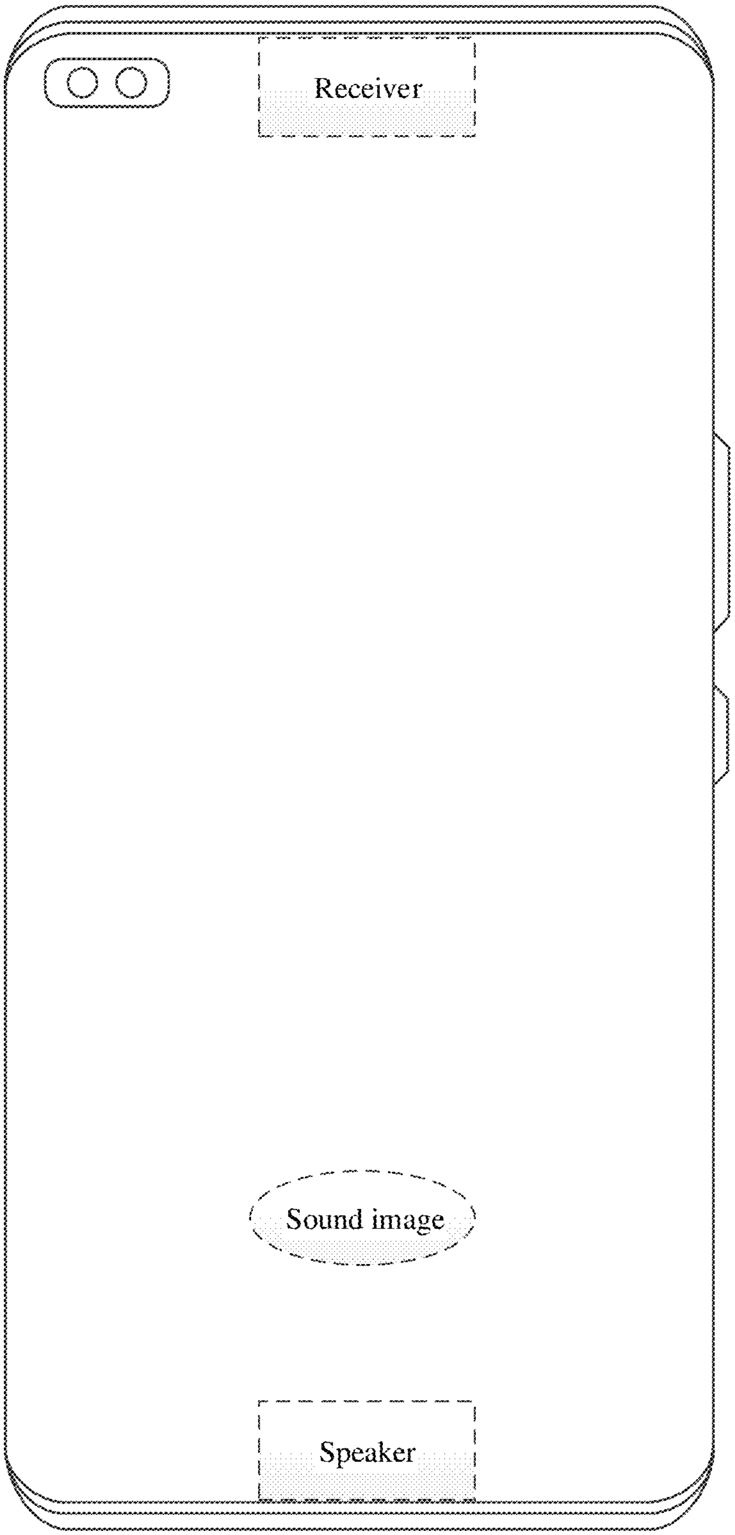
FIG. 2A, FIG. 2B, and FIG. 2C are a schematic diagram of a manner of disposing a play component in a terminal device according to an embodiment of this application.
Figure 2B:
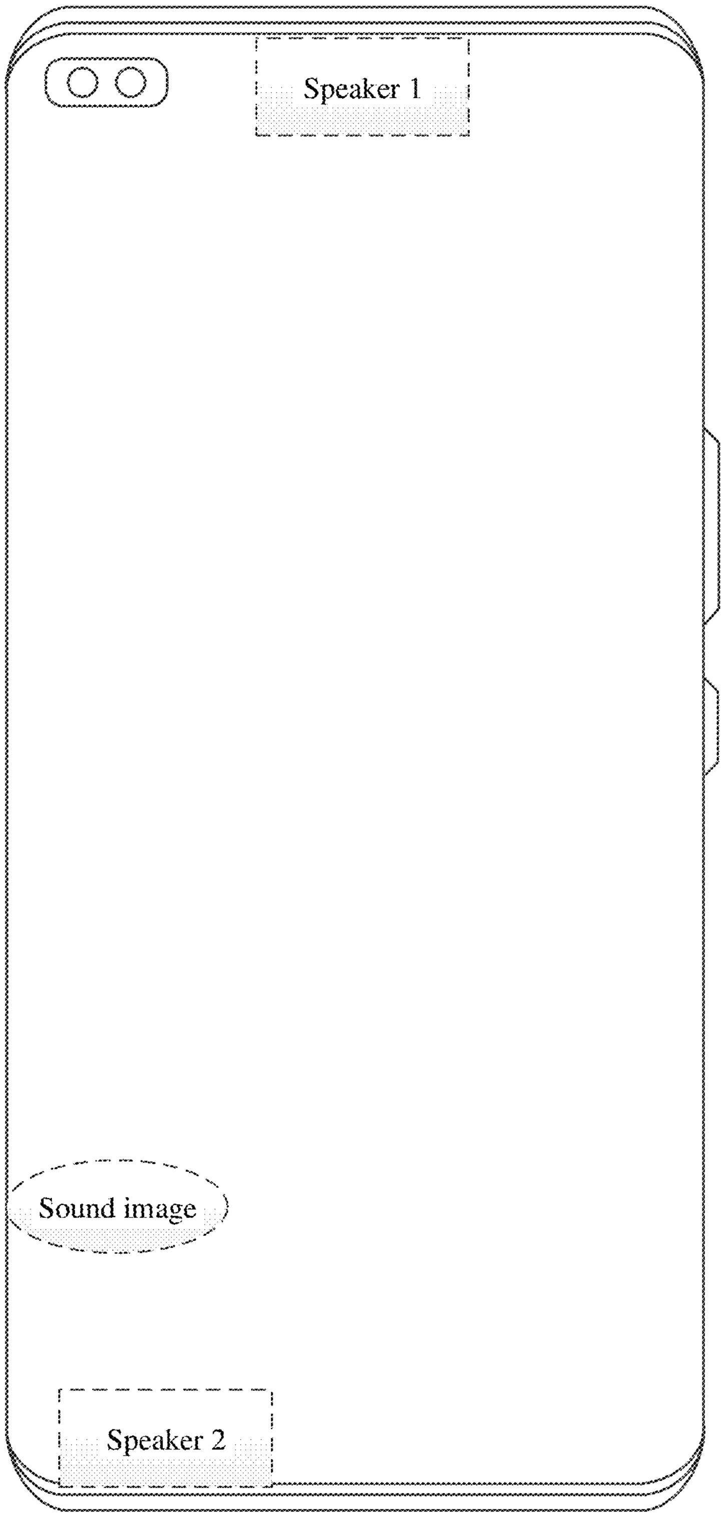
Figure 2C:
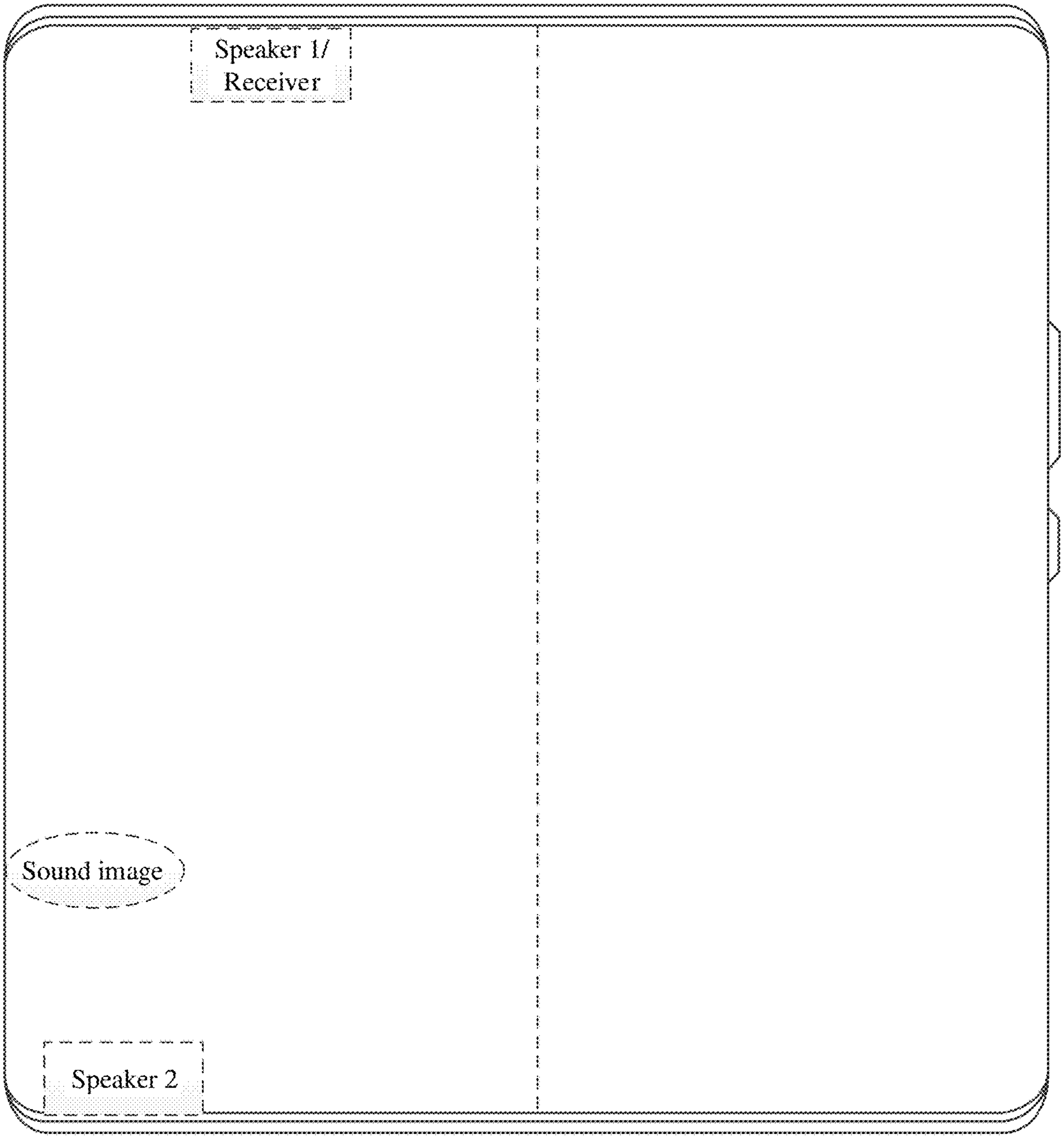

For example, FIG. 2A, FIG. 2B, and FIG. 2C are a schematic diagram of a manner of disposing a play component in a terminal device according to an embodiment of this application.

For a terminal device shown in FIG. 2A, two play components of different types may be disposed in the terminal device, and the two play components are symmetrically disposed. For example, a receiver may be disposed at a top-middle location of the terminal device, and a speaker may be disposed at a bottom-middle location of the terminal device. Because the two play components are of different types, when the two play components play audio, a sound image may deviate from a central location of the terminal device, for example, the sound image may be close to the speaker or another location.

For a terminal device shown in FIG. 2B, two play components of a same type may be disposed in the terminal device, and the two play components are asymmetrically disposed. For example, a speaker 1 may be disposed at a top-middle location of the terminal device, and a speaker 2 may be disposed at a bottom-left location of the terminal device. Because the two play components are asymmetrically disposed, when the two play components play audio, a sound image deviates from a central location of the terminal device, for example, the sound image may be close to the speaker 2 or another location.

In a possible implementation, a manner of asymmetrically disposing the two play components in the terminal device may be not limited to the description shown in FIG. 2B. For example, the speaker 1 may be disposed at a top-right location of the terminal device, and the speaker 2 may be disposed at a bottom-middle location of the terminal device; or the speaker 1 may be disposed at a top-right location of the terminal device, and the speaker 2 may be disposed at the bottom-left location of the terminal device. This is not limited in this embodiment of this application.

In a possible implementation, two play components of different types may alternatively be disposed in the terminal device, and the two play components are asymmetrically disposed. In this scenario, a sound image may also deviate from a central location of the terminal device.

For a terminal device shown in FIG. 2C, the terminal device may be a mobile phone with a foldable screen, two play components of a same type (or different types) may be disposed in the terminal device, and the two play components are asymmetrically disposed. For example, a speaker 1 may be disposed at a top-middle location on a left half-screen of the terminal device, and a speaker 2 may be disposed at a bottom-left location on the left half-screen of the terminal device; or a receiver may be disposed at a top-middle location on a left half-screen of the terminal device, and a speaker 2 may be disposed at a bottom-left location on the left half-screen of the terminal device. In this scenario, a sound image may be close to the speaker 2 or another location.

It may be understood that a manner of asymmetrically disposing the two play components in the terminal device may be not limited to the description shown in FIG. 2B. In addition, when the terminal device is a mobile phone with a foldable screen, locations of the two play components may not be limited to the left half-screen of the terminal device. This is not limited in this embodiment of this application.

It may be understood that when the terminal device includes a plurality of play components, the plurality of play components may be of different types, and the plurality of play components may be symmetrically or asymmetrically disposed. This is not limited in this embodiment of this application.

Based on the description in FIG. 2A, FIG. 2B, and FIG. 2C, because of types of at least two play components in the terminal device and asymmetric disposing of the at least two play components, when the terminal device replays a video by using the at least two players, a sound image deviates from a central location of the terminal device, resulting in a problem of sound-picture separation and a narrow sound field.

As shown in FIG. 1, when the terminal device replays the video 100, loudness of an audio signal output by a play component at a bottom end of the terminal device may be greater than loudness of an audio signal output by a play component at a top end of the terminal device, so that a sound image is close to the bottom end of the terminal device, and deviates from a central location of the terminal device. However, in this case, the target 100 and the target 102 in a picture of the video 100 are still located at the central location, resulting in a problem of sound-picture separation.

In view of this, the embodiments of this application provide a sound image calibration method. A terminal device displays a first interface, where the first interface includes a first control used to play a target video. When the terminal device receives a first operation performed on the first control, the terminal device displays a second interface, and the terminal device outputs a first target audio signal by using a first play component, and outputs a second target audio signal by using a second play component. The first target audio signal and the second target audio signal indicate that a sound image of the target video is located at a first location, and the first location may deviate from a central location of the terminal device. Further, when the terminal device receives a second operation performed on a second control used to enable sound image calibration, the terminal device corrects the sound image, outputs a third target audio signal by using the first play component, and outputs a fourth target audio signal by using the second play component. The first target audio signal and the second target audio signal indicate that the sound image of the target video is located at a second location. Compared with the first location, the second location is close to the central location of the terminal device, to improve an audio replay effect, and extend a sound field.

It may be understood that the sound image calibration method provided in the embodiments of this application may be applied not only to the scenario in which the terminal device plays a video in a speaker mode shown in FIG. 1, but also to a scenario in which the terminal device plays a video in a speaker mode in any application. An application scenario of the sound image calibration method is not limited in the embodiments of this application.

It may be understood that the terminal device may also be referred to as a terminal (terminal), user equipment (user equipment, UE), a mobile station (mobile station, MS), a mobile terminal (mobile terminal, MT), or the like. The terminal device may be a mobile phone (mobile phone) having at least two play components, a smart television, a wearable device, a tablet computer (Pad), a computer with a wireless sending/receiving function, a virtual reality (virtual reality, VR) terminal device, an augmented reality (augmented reality, AR) terminal device, a wireless terminal in industrial control (industrial control), a wireless terminal in self-driving (self-driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or the like. A specific technology and a specific device form that are used by the terminal device are not limited in the embodiments of this application.

Figure 3:
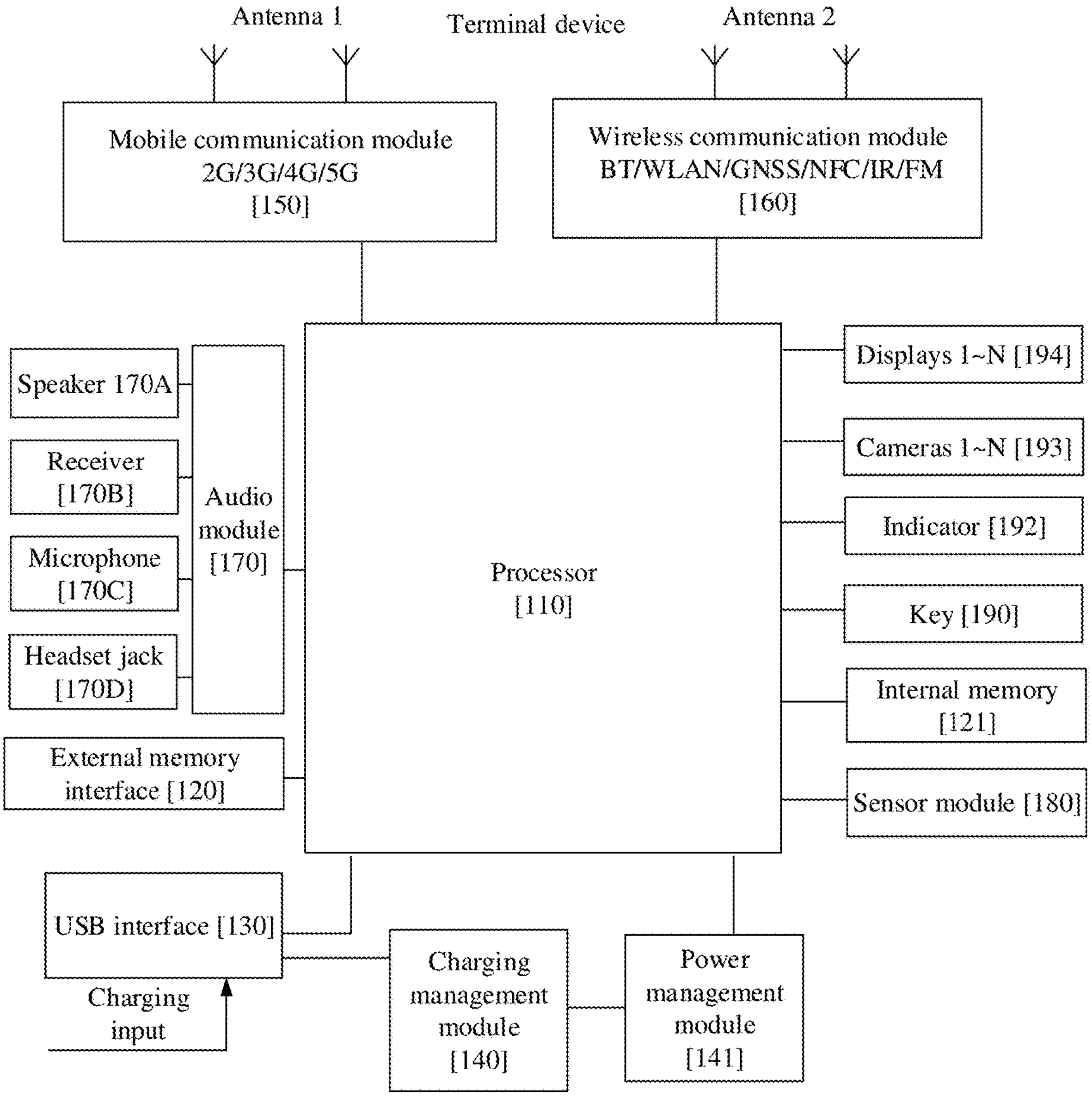
FIG. 3 is a schematic diagram of a hardware structure of a terminal device according to an embodiment of this application.

Therefore, to better understand the embodiments of this application, the following describes a structure of the terminal device in the embodiments of this application. For example, FIG. 3 is a schematic diagram of a structure of a terminal device according to an embodiment of this application.

The terminal device may include a processor 110, an external memory interface 120, an internal memory 121, a universal serial bus (universal serial bus, USB) interface 130, a charging management module 140, a power management module 141, an antenna 1, an antenna 2, a mobile communication module 150, a wireless communication module 160, an audio module 170, a speaker 170A, a receiver 170B, a microphone 170C, a headset jack 170D, a sensor module 180, a key 190, an indicator 192, a camera 193, a display 194, and the like.

It may be understood that the structure shown in this embodiment of this application does not constitute a specific limitation on the terminal device. In some other embodiments of this application, the terminal device may include more or fewer parts than those shown in the figure, some parts may be combined, some parts may be split, or a different part arrangement may be used. The parts shown in the figure may be implemented by hardware, software, or a combination of software and hardware.

The processor 110 may include one or more processing units. Different processing units may be independent components, or may be integrated into one or more processors. A memory may be further disposed in the processor 110, and is configured to store instructions and data.

The USB interface 130 is an interface that complies with USB standard specifications, and may be specifically a Mini USB interface, a Micro USB interface, a USB Type C interface, or the like. The USB interface 130 may be configured to be connected to a charger to charge the terminal device, may be configured to transmit data between the terminal device and a peripheral device, or may be configured to be connected to a headset to play audio by using the headset. The interface may alternatively be configured to be connected to another terminal device, for example, an AR device.

The charging management module 140 is configured to receive a charging input from a charger. The charger may be a wireless charger or a wired charger. The power management module 141 is configured to be connected to the charging management module 140 and the processor 110.

A wireless communication function of the terminal device may be implemented by using the antenna 1, the antenna 2, the mobile communication module 150, the wireless communication module 160, a modem processor, a baseband processor, and the like.

The antenna 1 and the antenna 2 are configured to transmit and receive electromagnetic wave signals. The antenna in the terminal device may be configured to cover one or more communication bands. Different antennas may be further multiplexed to improve antenna utilization.

The mobile communication module 150 may provide a wireless communication solution that is applied to the terminal device, including 2G/3G/4G/5G and the like. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation.

The wireless communication module 160 may provide a wireless communication solution that is applied to the terminal device and that includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), and the like.

The terminal device implements a display function by using a GPU, the display 194, an application processor, and the like. The GPU is a microprocessor for image processing and is connected to the display 194 and the application processor. The GPU is configured to perform mathematical and geometric computing for graphics rendering.

The display 194 is configured to display an image, a video, and the like. The display 194 includes a display panel. In some embodiments, the terminal device may include one or N displays 194, where N is a positive integer greater than 1.

The terminal device may implement a shooting function by using an ISP, the camera 193, a video codec, the GPU, the display 194, the application processor, and the like.

The camera 193 is configured to capture a still image or a video. In some embodiments, the terminal device may include one or N cameras 193, where N is a positive integer greater than 1.

The external memory interface 120 may be configured to be connected to an external memory card such as a Micro SD card, to expand a storage capacity of the terminal device. The external memory card communicates with the processor 110 by using the external memory interface 120, to implement a data storage function. For example, files such as music and videos are stored in the external memory card.

The internal memory 121 may be configured to store computer-executable program code, and the executable program code includes instructions. The internal memory 121 may include a program storage area and a data storage area.

The terminal device may implement an audio function, for example, audio playing or recording, by using the audio module 170, the speaker 170A, the receiver 170B, the microphone 170C, the headset jack 170D, the application processor, and the like.

The audio module 170 is configured to convert digital audio information into an analog audio signal for output, and is further configured to convert an analog audio input into a digital audio signal. The speaker 170A, also referred to as a "horn", is configured to convert an audio electrical signal into a sound signal, and the terminal device includes at least one speaker 170A. The terminal device may be used to listen to music or answer a call in a hands-free mode through the speaker 170A. The receiver 170B, also referred to as an "earpiece", is configured to convert an audio electrical signal into a sound signal. When the terminal device receives a call or a voice message, the receiver 170B may be placed close to a human ear to receive the voice.

In this embodiment of this application, a plurality of play components may be disposed in the terminal device, and the play component may include the speaker 170A and/or the receiver 170B. In a scenario in which the terminal device plays a video, the at least one speaker 170A and/or the at least one receiver 170B simultaneously play/plays an audio signal.

The headset jack 170D is configured to be connected to a wired headset. The microphone 170C, also referred to as a "mic" or "mike", is configured to convert a sound signal into an electrical signal. In this embodiment of this application, the terminal device may receive, based on the microphone 170C, a sound signal for waking up the terminal device, and convert the sound signal into an electrical signal, for example, voiceprint data described in the embodiments of this application, for subsequent processing. The terminal device may have at least one microphone 170C.

The sensor module 180 may include one or more of the following sensors, for example, a pressure sensor, a gyroscope sensor, a barometric pressure sensor, a magnetic sensor, an acceleration sensor, a distance sensor, an optical proximity sensor, a fingerprint sensor, a temperature sensor, a touch sensor, an ambient light sensor, or a bone conduction sensor (not shown in FIG. 3).

The key 190 includes a power-on/off key, a volume key, and the like. The key 190 may be a mechanical key, or may be a touch key. The terminal device may receive a key input and generate a key signal input related to user settings and function control of the terminal device. The indicator 192 may be an indicator light, may be configured to indicate a charging status or a power change, and may be further configured to indicate a message, a missed incoming call, a notification, and the like.

A software system of the terminal device may use a layered architecture, an event-driven architecture, a microkernel architecture, a micro-service architecture, a cloud architecture, or the like. Details are not described herein.

The following describes, in detail by using specific embodiments, the technical solutions of this application and how the foregoing technical problems are resolved by using the technical solutions of this application. The following several specific embodiments may be implemented independently, or may be combined with each other. For same or similar concepts or processes, details may not be described in some embodiments again.

Figure 4:
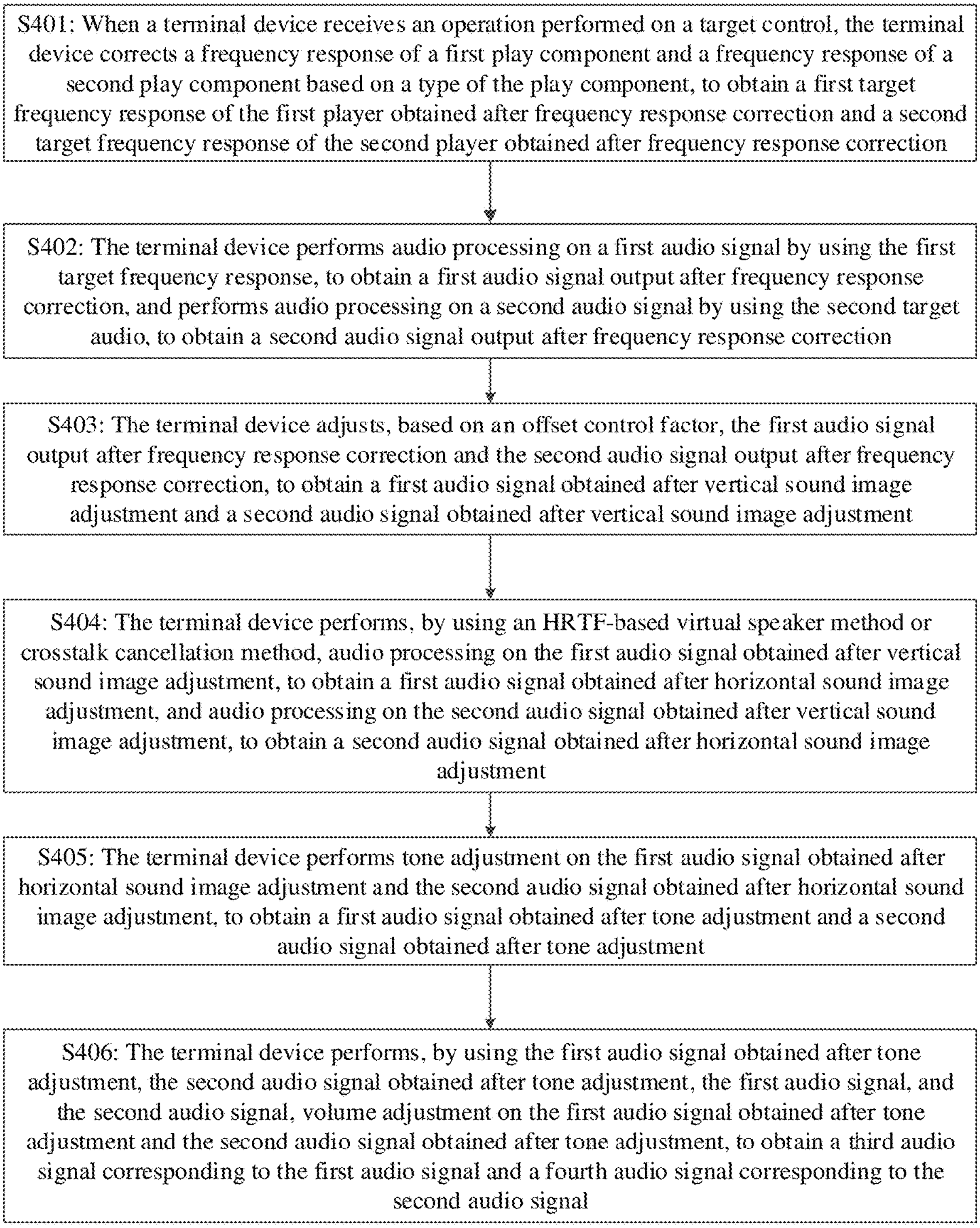
FIG. 4 is a schematic flowchart of a sound image calibration method according to an embodiment of this application.

For example, FIG. 4 is a schematic flowchart of a sound image calibration method according to an embodiment of this application. As shown in FIG. 4, the sound image calibration method may include the following steps.

S401: When a terminal device receives an operation performed on a target control, the terminal device corrects a frequency response of a first play component and a frequency response of a second play component based on a type of the play component, to obtain a first target frequency response of the first player obtained after frequency response correction and a second target frequency response of the second player obtained after frequency response correction.

In this embodiment of this application, the target control may be a control used to enable sound image calibration, and the target control may be disposed in an interface used to play a video.

In this embodiment of this application, both the first play component and the second play component may be speakers (or receivers) in the terminal device. For example, both the first play component and the second play component are speakers in the terminal device; the first play component may be any speaker in the terminal device, and the second play component may be any receiver in the terminal device; or the first play component may be any receiver in the terminal device, and the second play component may be any speaker in the terminal device. Types of the first play component and the second play component are not specifically limited in this embodiment of this application.

It may be understood that when the terminal device plays a video in a speaker mode, the first play component and the second play component may respectively play audio on different channels. For example, an audio signal played by the first play component may be a left-channel audio signal (or a right-channel audio signal), and an audio signal played by the second play component may be a right-channel audio signal (or a left-channel audio signal). This is not limited in this embodiment of this application.

Figure 5A:
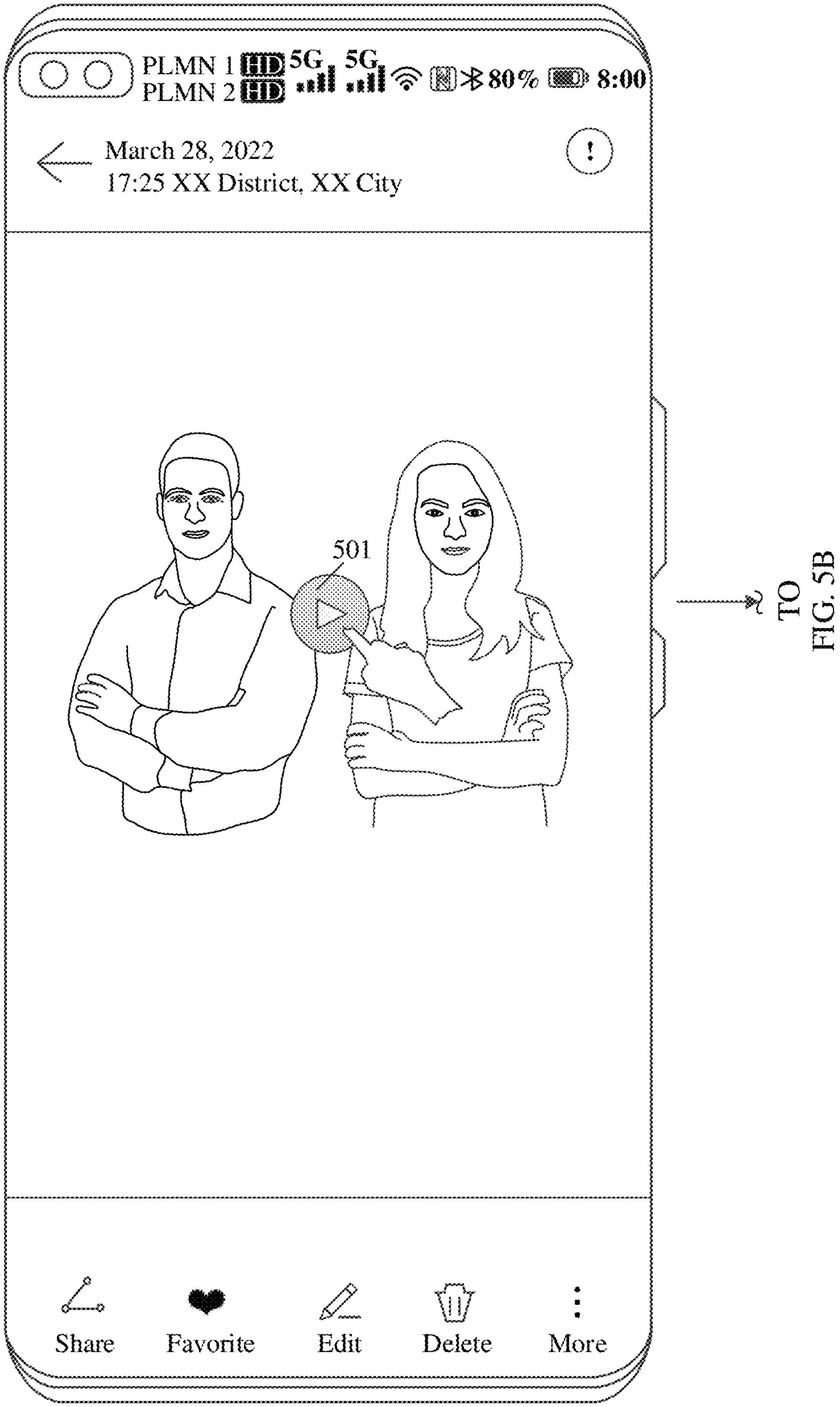
FIG. 5A and FIG. 5B are a schematic diagram of an interface for enabling sound image calibration according to an embodiment of this application.
Figure 5B:
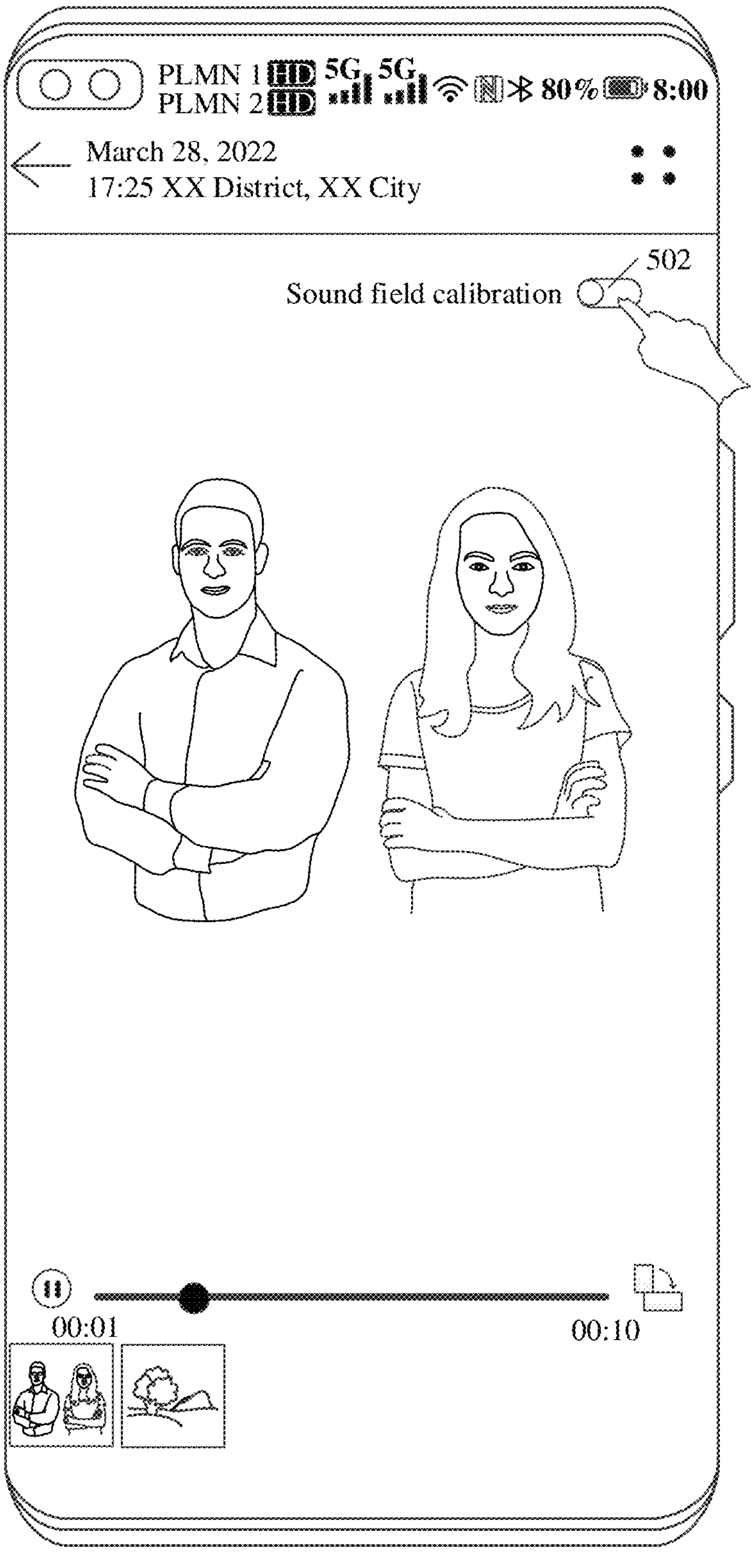

For example, FIG. 5A and FIG. 5B are a schematic diagram of an interface for enabling sound image calibration according to an embodiment of this application. In the embodiment corresponding to FIG. 5A and FIG. 5B, an example in which the terminal device is a mobile phone is used for description. This example does not constitute a limitation on this embodiment of this application.

When the terminal device receives an operation of opening any video by a user, the terminal device may display an interface shown in FIG. 5A. The interface may include a control 501 used to play a video, information used to indicate video information, a control used to exit video playing, a control used to view more video information, a control used to share a video, a control used to collect a video, a control used to edit a video, a control used to delete a video, a control used to view more functions, and the like.

In the interface shown in FIG. 5A, when the terminal device receives a trigger operation performed by the user on the control 501 used to play a video, the terminal device may display an interface shown in FIG. 5B. For the interface shown in FIG. 5B, the interface may include a control 502 used to enable sound image calibration, and the control 502 used to enable sound image calibration is in an off state. For other content displayed in the interface, refer to the descriptions in the embodiment corresponding to FIG. 1. Details are not described herein again.

In the interface shown in FIG. 5B, when the terminal device receives a trigger operation performed by the user on the control 502 used to enable sound image calibration, the terminal device may enable a sound image calibration procedure, so that the terminal device performs steps shown in S402-S406.

In a possible implementation, the terminal device may alternatively provide, in settings, a switch used to automatically enable sound image calibration when a video is played. When the switch used to automatically enable sound image calibration when a video is played is turned on, and the terminal device receives a trigger operation performed by the user in the interface shown in FIG. 5A on the control 501 used to play a video, the terminal device may enable a sound image calibration procedure by default, so that the terminal device performs steps shown in S402-S406.

It may be understood that in this embodiment of this application, a manner of enabling sound image calibration when a video is played in a speaker mode is not specifically limited.

It may be understood that a frequency response difference between play components is reflected in a replay difference between the play components for audio signals at different frequencies, which affects a location of a sound image. Therefore, the terminal device can correct a frequency response of the play component, so that an amplitude of the frequency response of the play component is flat, and frequency response trends of a plurality of play components are close to each other, to resolve a problem that is of deviation of the sound image from a center and that is caused by inconsistent frequency responses.

Based on this, the terminal device can gradually adjust, through frequency response correction, the location of the sound image from a location that originally deviates towards a speaker to a location close to a middle between two speakers. Further, because of an error generated during frequency response correction and a component limitation of the speaker, the sound image still deviates from a central location. Therefore, the terminal device can further adjust the sound image based on steps shown in S403-S406.

S402: The terminal device performs audio processing on a first audio signal by using the first target frequency response, to obtain a first audio signal output after frequency response correction, and performs audio processing on a second audio signal by using the second target audio, to obtain a second audio signal output after frequency response correction.

The first audio signal (or referred to as an initial audio signal corresponding to the first play component) may be an audio signal that needs to be input to the first play component for play before the terminal device performs frequency response correction on the first play component, or may be understood as an original mono audio signal. The second audio signal (or referred to as an initial audio signal corresponding to the second play component) may be an audio signal that needs to be input to the second play component for play before the terminal device performs frequency response correction on the second play component, or may be understood as another original mono audio signal.

For example, the terminal device may perform convolutional processing on the first target frequency response and the first audio signal, to obtain the first audio signal (or referred to as a fifth target audio signal) output after frequency response correction, and perform convolutional processing on the second target frequency response and the second audio signal, to obtain the second audio signal (or referred to as a sixth target audio signal) output after frequency response correction.

S403: The terminal device adjusts, based on an offset control factor, the first audio signal output after frequency response correction and the second audio signal output after frequency response correction, to obtain a first audio signal obtained after vertical sound image adjustment and a second audio signal obtained after vertical sound image adjustment.

The offset control factor is used to indicate a frequency response difference between the first audio signal output after frequency response correction and the second audio signal output after frequency response correction.

In an implementation, the terminal device may determine the offset control factor on a target frequency band, and adjust, on the target frequency band, the first audio signal output after frequency response correction and the second audio signal output after frequency response correction, to obtain the first audio signal obtained after vertical sound image adjustment and the second audio signal obtained after vertical sound image adjustment.

For example, the terminal device may obtain a target frequency band [k1, k2] on which frequency responses between the first target frequency response and the second target frequency response are close to each other, and there may be N frequencies in the target frequency band [k1, k2]. The target frequency band on which frequency responses are close to each other may be a frequency band corresponding to a case in which a similarity between the first target frequency response and the second target frequency response is greater than a preset threshold.

The terminal device separately inputs an equal-loudness sweep signal (or referred to as a first sweep signal) to the first play component and the second play component, to obtain a first playback signal $Y_L(f)$ and a second playback signal $Y_R(f)$. The equal-loudness sweep signal may be a signal that has a same amplitude and a frequency of [k1, k2].

The terminal device determines the offset control factor α based on a frequency response difference between the first playback signal and the second playback signal:

$$\alpha = \frac{1}{N}\sum_{k_1}^{k_2} |Y_L(k) - Y_R(k)| \quad \text{formula (1)}$$

Further, when the terminal device determines that $Y_L(k)-Y_R(k)$ is greater than 0, the terminal device may apply a to the second audio signal that is output after frequency response correction and that corresponds to the second playback signal. For example, the second audio signal obtained after vertical sound image adjustment may be a second audio signal output after α*frequency response correction. In this case, the first audio signal output after frequency response correction may not be processed. Alternatively, when the terminal device determines that $Y_L(k)-Y_R(k)$ is less than 0, the terminal device may apply a to the first audio signal that is output after frequency response correction and that corresponds to the first playback signal. For example, the first audio signal obtained after vertical sound image adjustment may be a first audio signal output after α*frequency response correction. In this case, the second audio signal output after frequency response correction may not be processed.

In another implementation, the terminal device may divide a full frequency band into M sub-bands, and determine an offset control factor on each sub-band, to obtain M offset control factors; and then adjust, by using the M offset control factors, the first audio signal, on the full frequency band, output after frequency response correction and the second audio signal, on the full frequency band, output after frequency response correction, to obtain the first audio signal obtained after vertical sound image adjustment and the second audio signal obtained after vertical sound image adjustment.

For example, the terminal device separately inputs a full-band sweep signal (or referred to as a second sweep signal) to the first play component and the second play component, to obtain a third playback signal $Y_L(f)$ and a fourth playback signal $Y_R(f)$. The full-band sweep signal may be a signal that has a same amplitude.

The terminal device divides the third playback signal into M sub-signals, to obtain the M sub-signals corresponding to the third playback signal, and divides the fourth playback signal into M sub-signals, to obtain the M sub-signals corresponding to the fourth playback signal.

The terminal device may control a frequency response difference of any pair of sub-signals in the M sub-signals corresponding to the third playback signal and the M sub-signals corresponding to the fourth playback signal. It may be understood that the terminal device may obtain M pairs of sub-signals, and any one of the M pairs of sub-signals may be an ith sub-signal in the M sub-signals corresponding to the third playback signal and an ith sub-signal in the M sub-signals corresponding to the fourth playback signal.

It may be understood that based on the ith sub-signal $Y_{Li}(k)$ in the M sub-signals corresponding to the third playback signal and the ith sub-signal $Y_{Ri}(k)$ in the M sub-signals corresponding to the fourth playback signal, an obtained ith offset control factor $\alpha_i$ may be as follows:

$$\alpha_i = \frac{1}{N}\sum_{k_3}^{k_4} |Y_{Li}(k) - Y_{Ri}(k)| \quad \text{formula (2)}$$

Herein, [k3, k4] may be a frequency band corresponding to the ith sub-signal $Y_{Li}(k)$ and the ith sub-signal $Y_{Ri}(k)$, and there may be N frequencies in [k3, k4].

It may be understood that the terminal device may obtain the M offset control factors, process audio signals in the M pairs of sub-signals respectively corresponding to the M offset control factors, and concatenate M processing results to form a full-band signal based on a frequency, to obtain the first audio signal obtained after vertical sound image adjustment and the second audio signal obtained after vertical sound image adjustment.

Based on this, the terminal device may adjust the sound image in a vertical direction based on the offset control factor, so that a direction jointly indicated by the first audio signal obtained after vertical sound image adjustment and the second audio signal obtained after vertical sound image adjustment is close to a middle between the two play components in the vertical direction.

S404: The terminal device performs, by using a head-related transfer function (head related transfer function, HRTF)-based virtual speaker method or crosstalk cancellation method, audio processing on the first audio signal obtained after vertical sound image adjustment, to obtain a first audio signal obtained after horizontal sound image adjustment, and audio processing on the second audio signal obtained after vertical sound image adjustment, to obtain a second audio signal obtained after horizontal sound image adjustment.

In this embodiment of this application, the terminal device may determine that the terminal device is in a landscape state or a portrait state. When the terminal device is in the portrait state, the terminal device processes, by using the HRTF-based virtual speaker, the first audio signal (or referred to as a seventh target audio signal) obtained after vertical sound image adjustment and the second audio signal (or referred to as an eighth target audio signal) obtained after vertical sound image adjustment. Alternatively, when the terminal device is in the landscape state, the terminal device processes, by using the crosstalk cancellation method, the first audio signal obtained after vertical sound image adjustment and the second audio signal obtained after vertical sound image adjustment.

In an implementation, when the terminal device is in the portrait state, the terminal device processes, by using the HRTF-based virtual speaker method, the first audio signal obtained after vertical sound image adjustment and the second audio signal obtained after vertical sound image adjustment.

A plurality of pairs of HRTF values may be prestored in the terminal device, and the HRTF values are usually set in pairs based on left and right virtual speakers. For example, the plurality of pairs of HRTF values may include HRTF values of a plurality of left virtual speakers and an HRTF value of a right virtual speaker corresponding to an HRTF value of any left virtual speaker.

Figure 6:
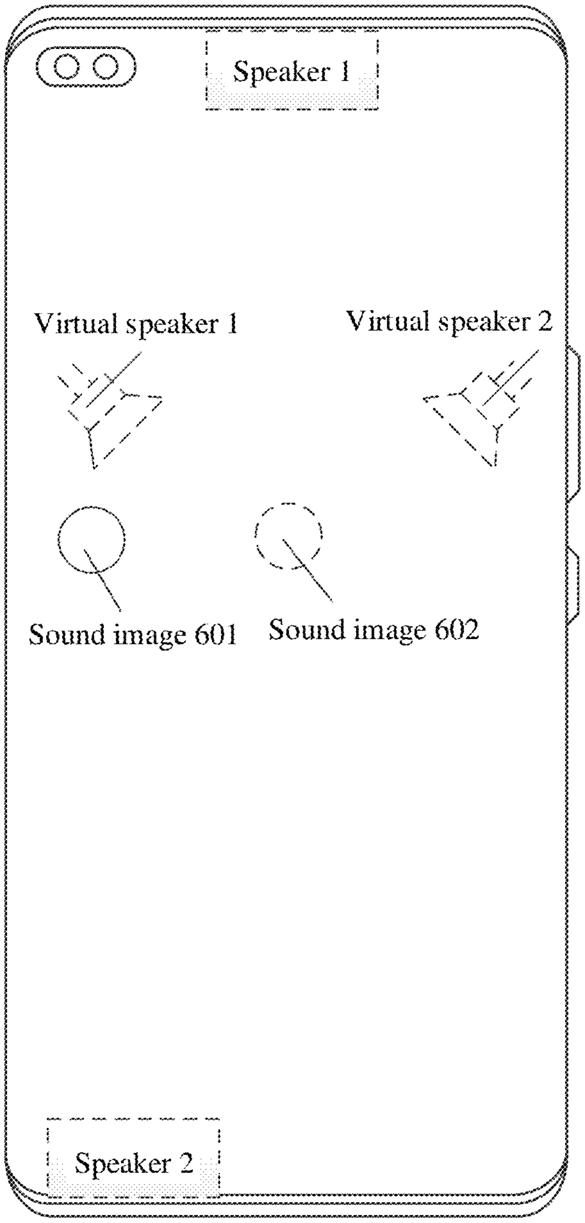
FIG. 6 is a schematic diagram of an interface for vertical sound image adjustment according to an embodiment of this application.

For example, FIG. 6 is a schematic diagram of an interface for vertical sound image adjustment according to an embodiment of this application. In the interface shown in FIG. 6, a sound image 601 in the interface may be understood as a sound image obtained after vertical sound image adjustment in the step shown in S403 is performed, and the sound image 602 may be understood as a target sound image at a center point location.

For example, the terminal device may set HRTF values of one pair of preset left and right virtual speakers for the center point location, or it is understood as that the terminal device creates a virtual speaker 1 and a virtual speaker 2 for the center point location, so that when the virtual speaker 1 and the virtual speaker 2 play an audio signal, a sound image location may be a location at which the sound image 602 is located.

Further, an example in which the first play component is a play component close to a left side of the user and the second play component is a play component close to a right side of the user is used for description. For example, the terminal device performs, by using the HRTF value corresponding to the left virtual speaker, convolutional processing on the first audio signal obtained after vertical sound image adjustment, to obtain the first audio signal (or referred to as a ninth target audio signal) obtained after horizontal sound image adjustment, and performs, by using the HRTF value corresponding to the right virtual speaker, convolutional processing on the second audio signal obtained after vertical sound image adjustment, to obtain the second audio signal (or referred to as a tenth target audio signal) obtained after horizontal sound image adjustment.

It may be understood that the terminal device can simulate a pair of virtual speakers by using the HRTF-based virtual speaker method, so that when the pair of virtual speakers outputs an audio signal, the sound image can be located at the center point location of the terminal device, to extend a width of a sound field, so as to horizontally adjust the sound image.

In a possible implementation, HRTF values of a plurality of pairs of left and right virtual speakers may alternatively be set in the terminal device for the center point location, and the HRTF values of the plurality of pairs of left and right virtual speakers may correspond to different azimuths (or may be understood as "correspond to different sound fields or different sound field identifiers displayed in the terminal device"). Further, the terminal device may match HRTF values of a proper pair of left and right virtual speakers based on a requirement of the user for the sound field.

Figure 7A:
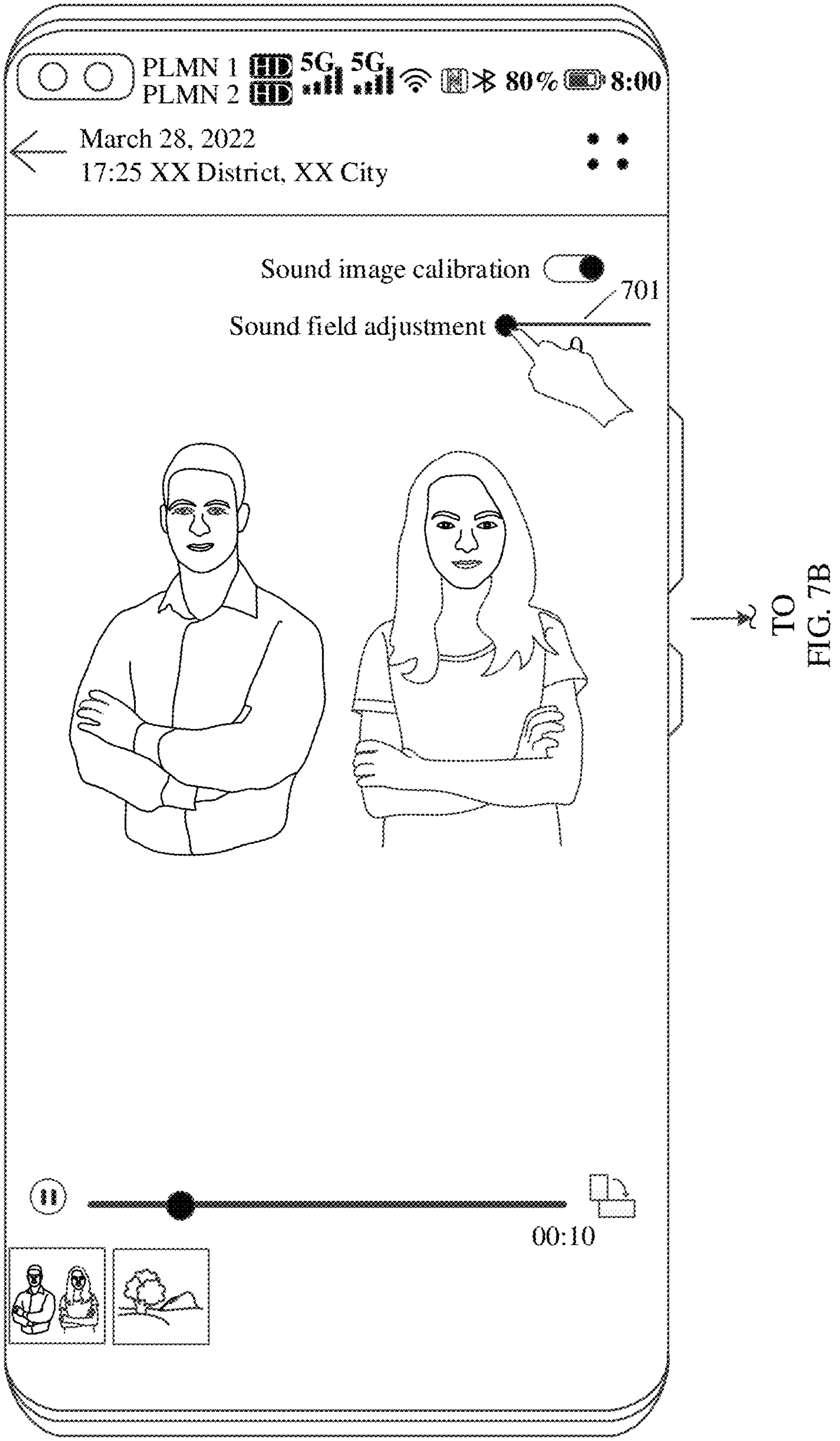
FIG. 7A and FIG. 7B are a schematic diagram of an interface for sound field adjustment according to an embodiment of this application.
Figure 7B:
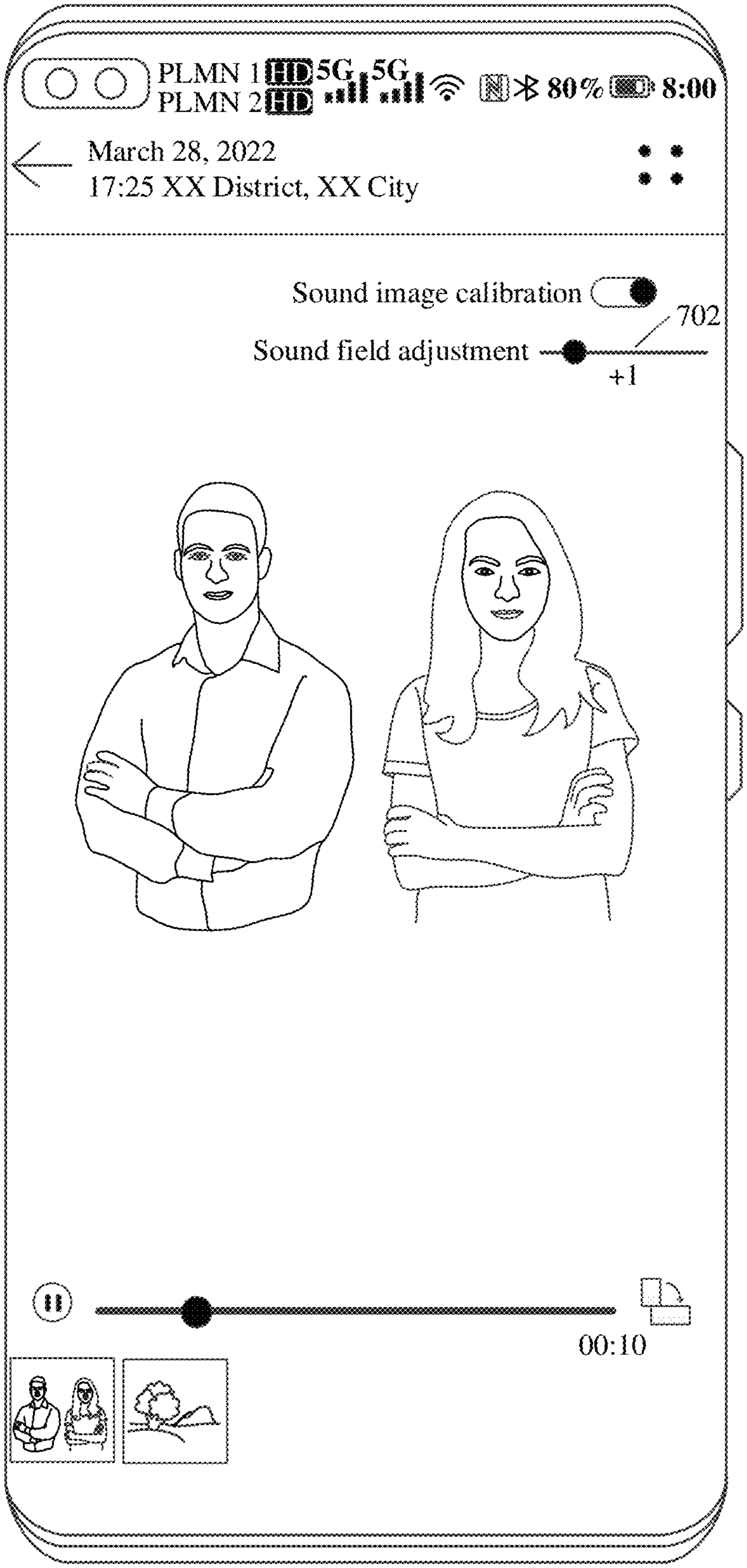

For example, FIG. 7A and FIG. 7B are a schematic diagram of an interface for sound field adjustment according to an embodiment of this application.

The terminal device displays an interface shown in FIG. 7A. The interface may include a progress bar 701 used to adjust a sound field. Other content displayed in the interface may be similar to that in the interface shown in FIG. 5A. Details are not described herein again. A sound field identifier may be displayed around the progress bar 701 used to adjust a sound field, for example, the sound field identifier is displayed as 0. Different values of the sound field identifier may be used to indicate HRTF values of left and right virtual speakers corresponding to different sound fields.

In the interface shown in FIG. 7A, when the terminal device receives an operation of sliding, by the user, the progress bar 701 used to adjust a sound field, so that the sound field identifier is displayed as 1, the terminal device may perform, by using an HRTF value of a left virtual speaker corresponding to a case in which the sound field identifier is displayed as 1, convolutional processing on the first audio signal obtained after vertical sound image adjustment, to obtain the first audio signal obtained after horizontal sound image adjustment, and perform, by using an HRTF value of a right virtual speaker corresponding to a case in which the sound field identifier is displayed as 1, convolutional processing on the second audio signal obtained after vertical sound image adjustment, to obtain the second audio signal obtained after horizontal sound image adjustment.

It may be understood that when the sound field identifier is displayed as 0, the terminal device may obtain HRTF values of left and right virtual speakers corresponding to the sound field identifier 0; and when the sound field identifier is displayed as 1, the terminal device may obtain HRTF values of left and right virtual speakers corresponding to the sound field identifier 1. It may be understood that a larger displayed value of the sound field identifier indicates a wider sound range that can be perceived by the user.

In a possible implementation, the terminal device may alternatively process, in the landscape state by using the HRTF-based virtual speaker method, the first audio signal obtained after vertical sound image adjustment and the second audio signal obtained after vertical sound image adjustment. In addition, the terminal device may alternatively implement sound field adjustment in the landscape state based on the embodiment corresponding to FIG. 7A and FIG. 7B. This is not limited in this embodiment of this application.

In another implementation, when the terminal device is in the landscape state, the terminal device processes, by using the crosstalk cancellation method, the first audio signal obtained after vertical sound image adjustment and the second audio signal obtained after vertical sound image adjustment.

For example, an example in which the first play component is a left speaker close to a left ear of the user and the second play component is a right speaker close to a right ear of the user is used for description. Crosstalk cancellation may be understood as canceling an audio signal propagating from the left speaker to the right ear and an audio signal propagating from the right speaker to the left ear, to extend the sound field.

Figure 8:
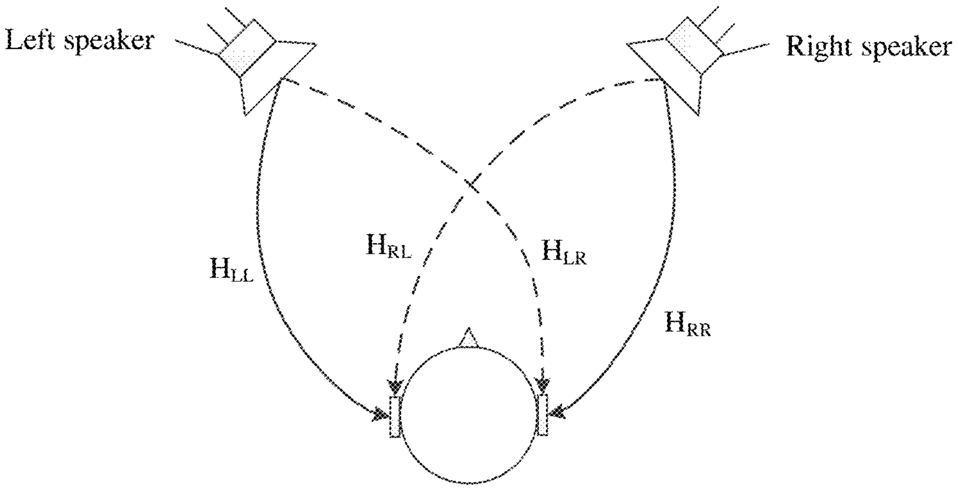
FIG. 8 is a schematic diagram of a principle of crosstalk cancellation according to an embodiment of this application.

For example, FIG. 8 is a schematic diagram of a principle of crosstalk cancellation according to an embodiment of this application. As shown in FIG. 8, the left speaker may not only send an ideal audio signal to the left ear of the user through $H_{LL}$, but also send an interfering audio signal to the right ear of the user through $H_{LR}$. Similarly, the right speaker not only sends an ideal audio signal to the right ear of the user through $H_{RR}$, but also sends an interfering audio signal to the left ear of the user through $H_{RL}$.

Therefore, to enable audio signals received by both the two ears of the user to be ideal audio signals, the terminal device may set a crosstalk cancellation matrix C for the left speaker and the right speaker. The crosstalk cancellation matrix C may be used to cancel an interfering audio signal.

Further, an actual signal I input to the two ears of the user after crosstalk cancellation may be as follows:

$$\underbrace{\begin{bmatrix} 1 & 0 \\ 0 & 1 \end{bmatrix}}_{I} \approx \underbrace{\begin{bmatrix} H_{LL} & H_{LR} \\ H_{RL} & H_{RR} \end{bmatrix}}_{H} \cdot \underbrace{\begin{bmatrix} C_{11} & C_{12} \\ C_{21} & C_{22} \end{bmatrix}}_{C} \quad \text{formula (3)}$$

The matrix H may be understood as an acoustic transfer function used to respectively transfer audio signals sent by the left speaker and the right speaker to the two ears.

Specifically, the terminal device may separately perform, by using the crosstalk cancellation matrix, crosstalk cancellation on the first audio signal obtained after vertical sound image adjustment and the second audio signal obtained after vertical sound image adjustment, to obtain the first audio signal obtained after horizontal sound image adjustment and the second audio signal obtained after horizontal sound image adjustment.

It may be understood that the terminal device may alternatively implement sound field adjustment in the embodiment corresponding to FIG. 7A and FIG. 7B based on crosstalk cancellation and at least one pair of HRTF values. This is not limited in this embodiment of this application.

It may be understood that the terminal device may extend the sound field based on crosstalk cancellation, so that the sound image is translated towards the central location in a horizontal direction. In a possible implementation, the terminal device may alternatively extend the sound field in another manner. This is not limited in this embodiment of this application.

S405: The terminal device performs tone adjustment on the first audio signal obtained after horizontal sound image adjustment and the second audio signal obtained after horizontal sound image adjustment, to obtain a first audio signal obtained after tone adjustment and a second audio signal obtained after tone adjustment.

In an implementation, a filter configured to adjust a tone may be disposed in advance in the terminal device. For example, the terminal device may input the first audio signal obtained after horizontal sound image adjustment and the second audio signal obtained after horizontal sound image adjustment to the filter, to obtain the first audio signal (or referred to as an eleventh target audio signal) obtained after tone adjustment and the second audio signal (or referred to as a twelfth target audio signal) obtained after tone adjustment.

The filter may include a peak filter, a shelving filter, a high-pass filter, a low-pass filter, or the like. It may be understood that different filters may correspond to different filtering parameters. For example, the filtering parameters may include a gain, a center frequency, and a Q value.

In another implementation, a correspondence between a plurality of groups of typical tones and filtering parameters is preset in the terminal device, so that the terminal device can select a different filter based on a requirement of the user for the tone.

Figure 9A:
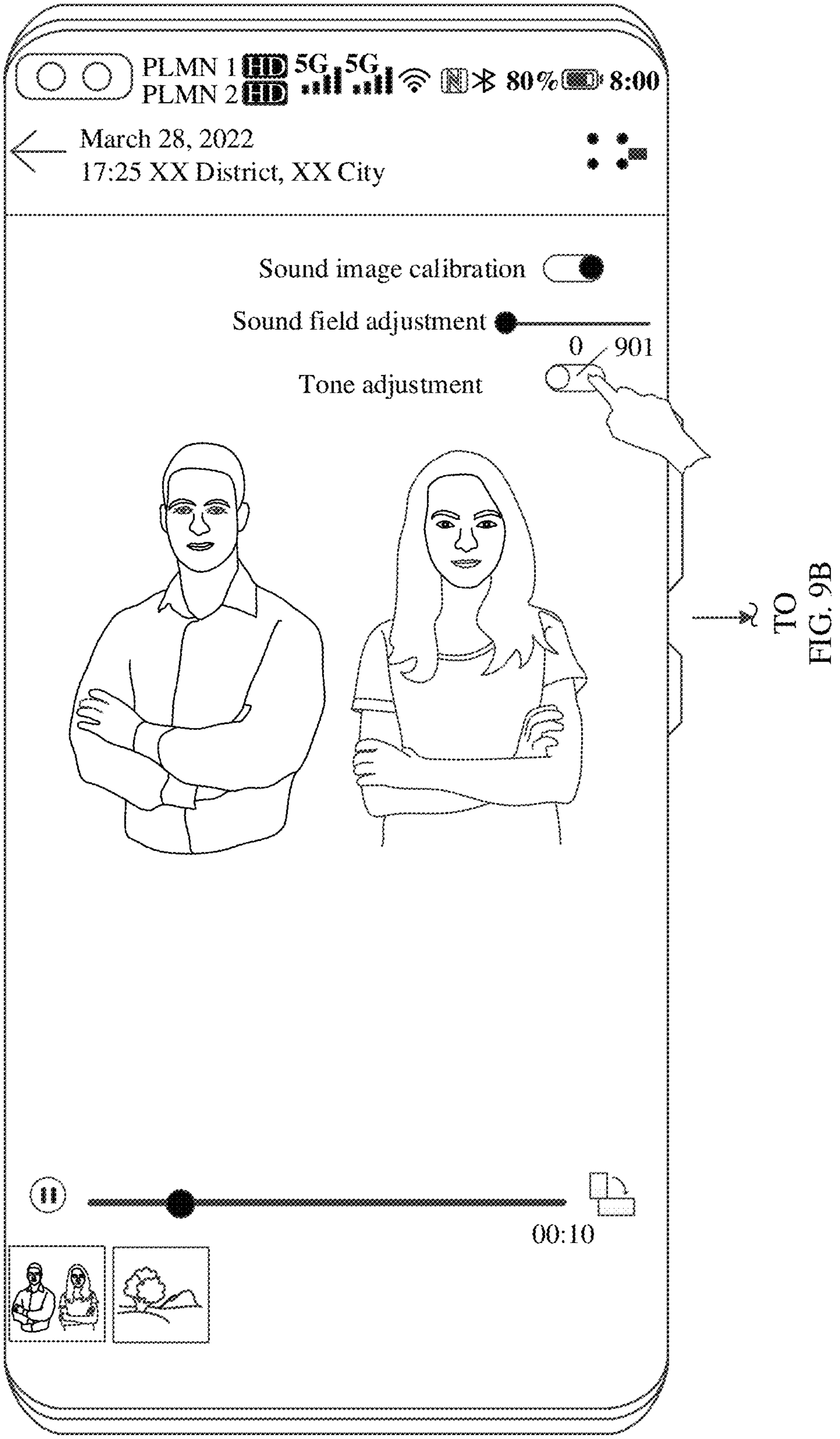
FIG. 9A and FIG. 9B are a schematic diagram of an interface for tone adjustment according to an embodiment of this application.
Figure 9B:
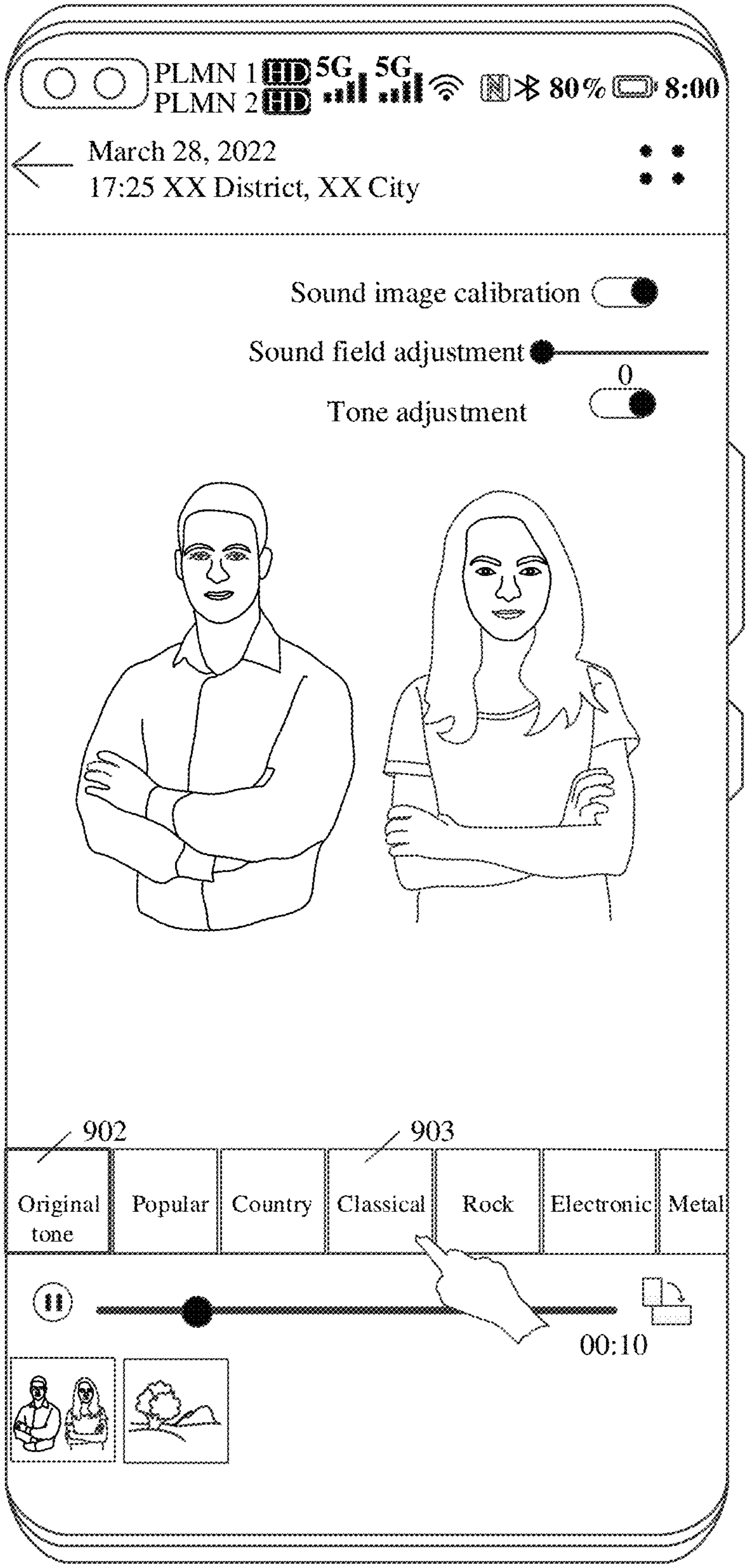

For example, FIG. 9A and FIG. 9B are a schematic diagram of an interface for tone adjustment according to an embodiment of this application.

The terminal device displays an interface shown in FIG. 9A. The interface may include a control 901 used to adjust a tone. Other content displayed in the interface may be similar to that in the interface shown in FIG. 7A. Details are not described herein again.

In the interface shown in FIG. 9A, when the terminal device receives a trigger operation performed by the user on the control 901 used to adjust a tone, the terminal device may display an interface shown in FIG. 9B. For the interface shown in FIG. 9B, the interface may include a plurality of typical tone controls, for example, an original tone control 902 used to indicate that no tone adjustment is performed, a popular tone control, a country tone control, a classical tone control 903, a rock tone control, an electronic tone control, and a metal tone control.

In the interface shown in FIG. 9B, when the terminal device receives a trigger operation performed by the user on the classical tone control 903, the terminal device may perform, by using a filtering parameter corresponding to a classical tone, filtering processing on the first audio signal obtained after horizontal sound image adjustment and the second audio signal obtained after horizontal sound image adjustment, to obtain the first audio signal obtained after tone adjustment and the second audio signal obtained after tone adjustment.

It may be understood that after correction of the speaker and rendering of the virtual speaker, a tone of the audio signal may be changed. Therefore, the terminal device can adjust the tone, to improve the tone of the audio, so as to improve sound quality of the audio.

S406: The terminal device performs, by using the first audio signal obtained after tone adjustment, the second audio signal obtained after tone adjustment, the first audio signal, and the second audio signal, volume adjustment on the first audio signal obtained after tone adjustment and the second audio signal obtained after tone adjustment, to obtain a third audio signal corresponding to the first audio signal and a fourth audio signal corresponding to the second audio signal.

The third audio signal may also be referred to as a third target audio signal, and the fourth audio signal may also be referred to as a fourth target audio signal.

For example, when the first audio signal is $x_{L(k)}$, the second audio signal is $x_{R(k)}$, the first audio signal obtained after tone adjustment is $z_{L(k)}$, and the second audio signal obtained after tone adjustment is $z_{R(k)}$, smoothing energy $E_x$ obtained by the terminal device based on the first audio signal $x_{L(k)}$ and the second audio signal $x_{R(k)}$ may be as follows:

$$E_x = \beta E_x + (1-\beta)\frac{1}{P}\sum_{k=0}^{P}(|x_{L(k)}| + |x_{R(k)}|) \quad \text{formula (4)}$$

Herein, β may be a smoothing coefficient, and P may be a frequency of the first audio signal or the second audio signal.

Similarly, smoothing energy $E_y$ obtained by the terminal device based on the first audio signal $z_{L(k)}$ obtained after tone adjustment and the second audio signal $z_{R(k)}$ obtained after tone adjustment may be as follows:

$$E_y = \beta E_y + (1-\beta)\frac{1}{P}\sum_{k=0}^{P}(|z_{L(k)}| + |z_{R(k)}|) \quad \text{formula (5)}$$

The terminal device may determine a dual-channel gain control factor δ based on $E_x$ and $E_y$. The factor may be as follows:

$$\delta = \frac{E_x}{E_y} \quad \text{formula (6)}$$

Further, the terminal device may separately adjust, by using δ, the first audio signal $z_{L(k)}$ obtained after tone adjustment and the second audio signal $z_{R(k)}$ obtained after tone adjustment, to obtain the third audio signal $\delta z_{L(k)}$ and the fourth audio signal $\delta z_{R(k)}$.

It may be understood that because the terminal device performs a series of processing in the steps shown in S401-S406, there is a gain difference between the first audio signal obtained after tone adjustment and the second audio signal obtained after tone adjustment. Therefore, volume of any audio signal may be adjusted based on smoothing energy of the any audio signal, so that the volume of the output dual-channel audio signal better meets user experience.

It may be understood that when the user does not turn on the control 502 used to enable sound image calibration, the terminal device may indicate, based on the audio signals played by the first play component and the second play component, that the sound image deviates from the central location of the terminal device. When the user turns on the control 502 used to enable sound image calibration, the terminal device may adjust the sound image based on the embodiment corresponding to FIG. 4, so that the sound image can be close to the central location of the terminal device.

It may be understood that the terminal device may improve the location of the sound image during speaker-mode video playing based on one or more methods in the steps shown in S401, S403, S404, S405, and S406. This is not limited in this embodiment of this application.

Based on this, the terminal device may adjust the sound image to be close to the central location of the terminal device through speaker correction, sound image translation control, and horizontal sound image control, to improve experience of viewing a video by the user.

Figure 10:
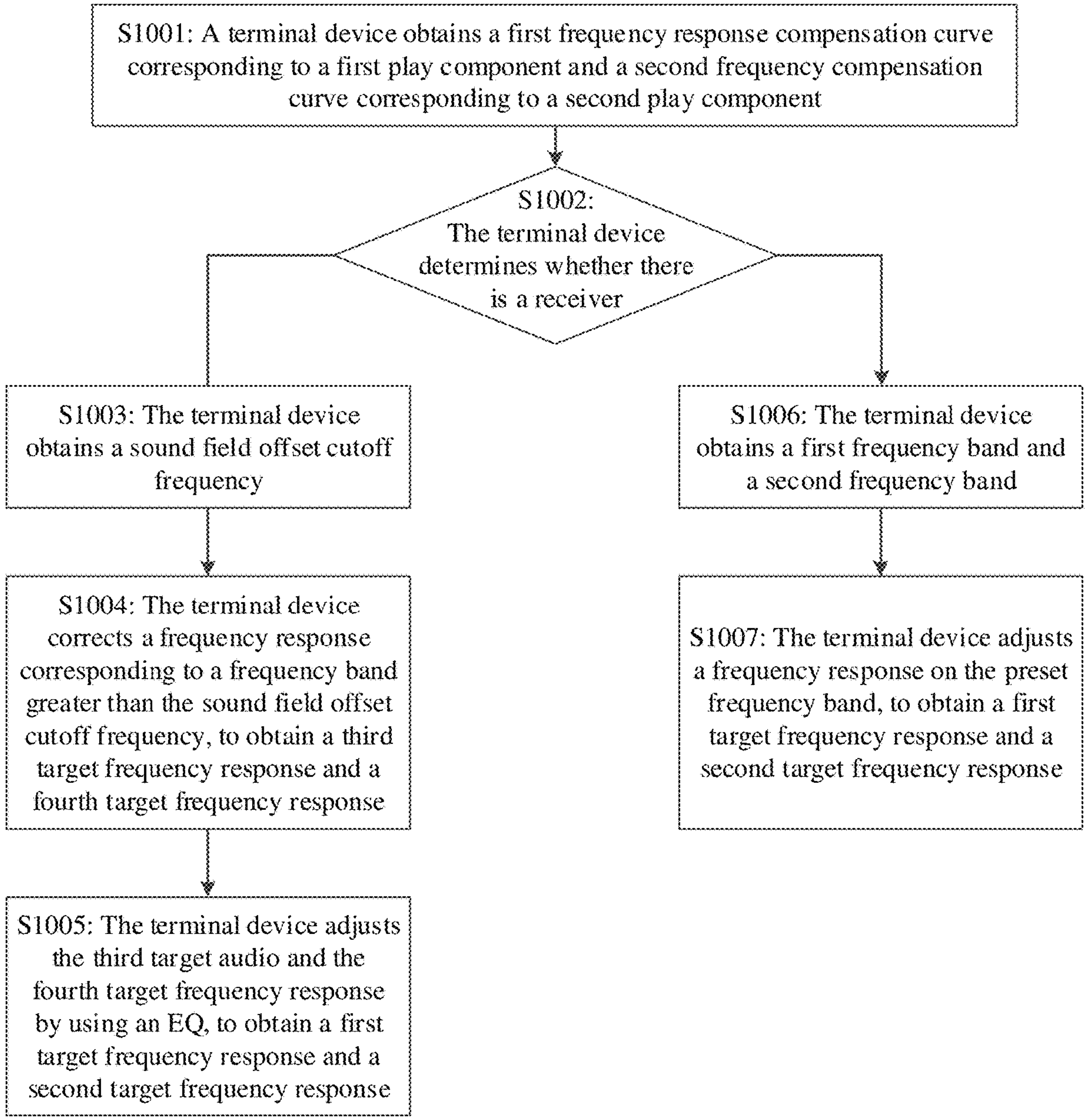
FIG. 10 is a schematic flowchart of frequency response correction based on psychology and physiology according to an embodiment of this application.

In a possible implementation, based on the embodiment corresponding to FIG. 4, for a method in which the terminal device corrects the frequency response of the first play component and the frequency response of the second play component in the step shown in S401, refer to an embodiment corresponding to FIG. 10.

For example, FIG. 10 is a schematic flowchart of frequency response correction based on psychology and physiology according to an embodiment of this application. In the embodiment corresponding to FIG. 10, an example in which the first play component is a left speaker, the second play component is a right speaker, the first audio signal is a left-channel audio signal, and the second audio signal is a right-channel audio signal is used for description. This example does not constitute a limitation on this embodiment of this application.

As shown in FIG. 10, the frequency response correction method may include the following steps.

S1001: The terminal device obtains a first frequency response compensation curve corresponding to the first play component and a second frequency response compensation curve corresponding to the second play component.

The frequency response compensation curve is used to adjust a frequency response curve of the play component to a curve that tends to be straight.

Figure 11:
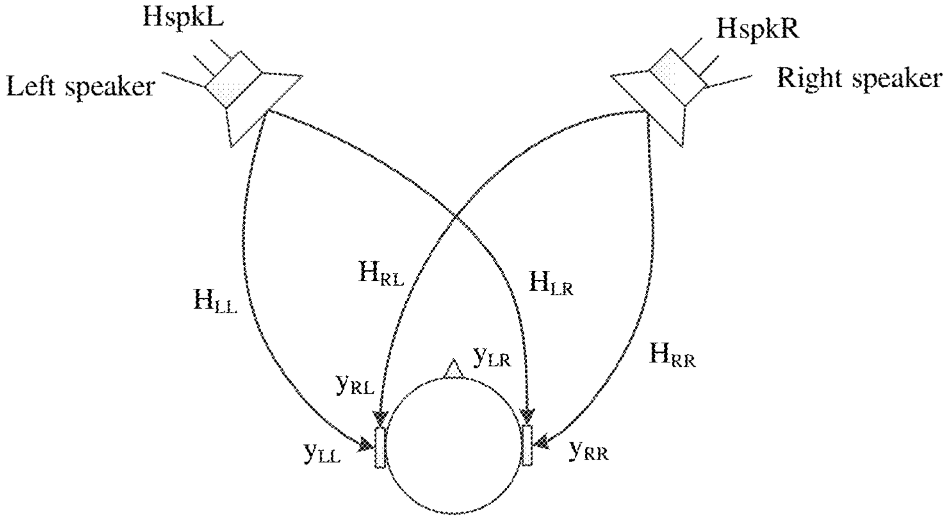
FIG. 11 is a schematic diagram of a frequency response calibration model of a play component according to an embodiment of this application.

For example, FIG. 11 is a schematic diagram of a frequency response calibration model of a play component according to an embodiment of this application. As shown in FIG. 11, the left speaker may be a speaker close to the left ear of the user, and the right speaker may be a speaker close to the right ear of the user.

For example, the left speaker plays a left-channel audio signal $x_{L(n)}$, the left-channel audio signal $x_{L(n)}$ reaches the left ear of the user through an environment $H_{LL}$, a signal received by the left ear may be $y_{LL}$, the left-channel audio signal $x_{L(n)}$ reaches the right ear of the user through an environment $H_{LR}$, and a signal received by the right ear may be $y_{LR}$. Similarly, the right speaker plays a right-channel audio signal $x_{R(n)}$, the left-channel audio signal $x_{R(n)}$ reaches the left ear of the user through an environment $H_{LR}$, a signal received by the left ear may be $y_{LR}$, the right-channel audio signal $x_{R(n)}$ reaches the right ear of the user through an environment $H_{RR}$, and a signal received by the right ear may be $y_{RR}$.

For a signal $y_{L(n)}$ received by the left ear of the user and a signal $y_{R(n)}$ received by the right ear of the user, refer to descriptions in a formula (7):

$$\begin{bmatrix} y_L(n) \\ y_R(n) \end{bmatrix} = \begin{bmatrix} H_{LL} & H_{LR} \\ H_{RL} & H_{RR} \end{bmatrix} \begin{bmatrix} x_L(n) * H_{spkL} \\ x_R(n) * H_{spkR} \end{bmatrix} \quad \text{formula (7)}$$

Herein, $H_{spkL}$ may be understood as a frequency response of the left speaker, $H_{spkR}$ may be understood as a frequency response of the right speaker, and * may be understood as convolution.

The left-channel audio signal $x_{L(n)}$ reaches the left ear and the right ear of the user through the left speaker. For the signal $y_{LL}$ received by the left ear, refer to descriptions in a formula (8), and for the signal $y_{LR}$ received by the right ear, refer to descriptions in a formula (9):

$$y_{LL}(n) = x_{L(n)} * H_{spkL} * H_{LL} \quad \text{formula (8)}$$

$$y_{LR}(n) = x_{L(n)} * H_{spkL} * H_{LR} \quad \text{formula (9)}$$

It may be understood that when the frequency response $H_{spkL}$ of the left speaker is calibrated, an environment factor may be considered. Therefore, $H_{spkL}*H_{LL}$ may be equivalent to the frequency response of the left speaker, and $H_{spkL}*H_{LR}$ is also equivalent to the frequency response of the left speaker. The formula (8) may be converted as follows:

$$y_{LL}(n) = x_{L(n)} * E_{LL} \quad \text{formula (10)}$$

The formula (9) may be converted as follows:

$$y_{LR}(n) = x_{L(n)} * E_{LR} \quad \text{formula (11)}$$

Further, the frequency response $H_{spkL}$ of the left speaker is equalized into an average value $E_{spkL}$ of frequency responses superimposed at two locations of the left and right ears:

$$E_{spkL} = 0.5 * (E_{LL} + E_{LR}) \quad \text{formula (12)}$$

It may be understood that to enable a calibrated frequency response curve of the left speaker to tend to be a smooth curve, a compensation curve $E_{spkL}^{-}$ (or referred to as a first frequency response compensation curve or a first frequency response compensation function) of $E_{spkL}$ may be estimated, so that the following formula is met:

$$E_{spkL} * E_{spkL}^{-1} = 1 \quad \text{formula (13)}$$

Similarly, a compensation curve (or referred to as a second frequency response compensation curve or a second frequency response compensation function) $E_{spkR}^{-}$ corresponding to the frequency response $H_{spkR}$ of the right speaker may also be obtained. A method for obtaining the compensation curve corresponding to the frequency response of the right speaker is similar to the manner of obtaining the compensation curve corresponding to the frequency response of the left speaker. Details are not described herein again.

S1002: The terminal device determines whether there is a receiver.

When the terminal device determines that there is a receiver (or understood as that the terminal device includes a speaker and a receiver), the terminal device may perform steps shown in S1003-S1004. Alternatively, when the terminal device determines that there is no receiver (or understood as that the terminal device includes a speaker and a speaker), the terminal device may perform steps shown in S1005-S1006.

It may be understood that generally, compared with the speaker, the receiver cannot replay a low-frequency signal. Therefore, when frequency response correction is performed on the receiver, an intermediate and high-frequency frequency response in a frequency response of the receiver may be corrected, to reduce correction complexity. The intermediate and high-frequency frequency response may be a frequency response greater than a cutoff frequency in the frequency response of the receiver.

In a possible implementation, the terminal device may not perform the step shown in S1002, and perform frequency response calibration based on a sound field offset cutoff frequency based on steps shown in S1003-S1005, or perform frequency response calibration based on psychology and physiology based on steps shown in S1006-S1007. Alternatively, the terminal device may not perform the step shown in S1002, perform frequency response calibration based on a sound field offset cutoff frequency based on steps shown in S1003-S1005, and jointly perform frequency response calibration based on psychology and physiology based on steps shown in S1006-S1007. This is not limited in this embodiment of this application.

S1003: The terminal device obtains the sound field offset cutoff frequency.

The sound field offset cutoff frequency (or may be referred to as a cutoff frequency or a target cutoff frequency) may be k0, and the sound field offset cutoff frequency may be preset. For example, the sound field offset cutoff frequency may be a cutoff frequency of the receiver.

It may be understood that the receiver has a relatively poor replay capability for a low-frequency signal that is less than the sound field cutoff frequency. Therefore, as shown in FIG. 2A, when the receiver is disposed at a top-middle location of the terminal device, and the speaker is disposed at a lower left corner location at a bottom end of the terminal device, the sound image deviates towards the speaker at the lower left corner.

S1004: The terminal device corrects a frequency response corresponding to a frequency band greater than the sound field offset cutoff frequency, to obtain a third target frequency response and a fourth target frequency response.

It may be understood that the terminal device may estimate a compensation function on the frequency band greater than the sound field offset cutoff frequency (the frequency band greater than the sound field offset cutoff frequency may also be referred to as a preset frequency band). For example, when a system function used to indicate the frequency response of the first play component is $E_{spkL}(k)$, a first frequency response compensation function $E_{spkL}^{-1}(k)$ of the first play component may be as follows:

$$E_{spkL}^{-1}(k) = \frac{1}{E_{spkL(k)}}(k > k0) \quad \text{formula (14)}$$

When a system function in frequency domain used to indicate the frequency response of the second play component is $E_{spkR}(k)$, a second frequency response compensation function $E_{spkR}^{-1}$ (k) of the second play component may be as follows:

$$E_{spkR}^{-1}(k) = \frac{1}{E_{spkR(k)}}(k > k0) \quad \text{formula (15)}$$

Further, the terminal device corrects the frequency response of the first play component by using the first frequency response compensation function $E_{spkL}^{-1}(k)$ of the first play component obtained in S1004, to obtain the third target frequency response, and corrects the frequency response of the second play component by using the second frequency response compensation function $E_{spkR}^{-1}(k)$ of the second play component obtained in S1004, to obtain the fourth target frequency response.

S1005: The terminal device adjusts the third target audio and the fourth target frequency response by using an equalizer (equalizer, EQ), to obtain the first target frequency response and the second target frequency response.

The EQ may adjust data with a relatively high amplitude in the third target frequency response to be close to an amplitude at another frequency, to obtain the first target frequency response, and adjust data with a relatively high amplitude in the fourth target frequency response to be close to an amplitude at another frequency, to obtain the second target frequency response.

It may be understood that the terminal device may correct the frequency response of the play component greater than the sound field offset cutoff frequency k0, to reduce complexity of an algorithm.

S1006: The terminal device obtains a first frequency band and a second frequency band.

In this embodiment of this application, the first frequency band may be understood as a frequency band on which layout of different asymmetric play components affects an interaural level difference, or may be understood as a frequency band that imposes impact on a physiological level of the user. For example, a commonly used frequency band, for example, 1000 Hz-8000 Hz, in a full frequency band may be obtained, and a frequency band corresponding to a case in which a change rate of an ILD meets a specific range (or is greater than a specific threshold) is obtained from the commonly used frequency band. For example, the first frequency band may be $[k1_{low}, k1_{high}]$.

Figure 12:
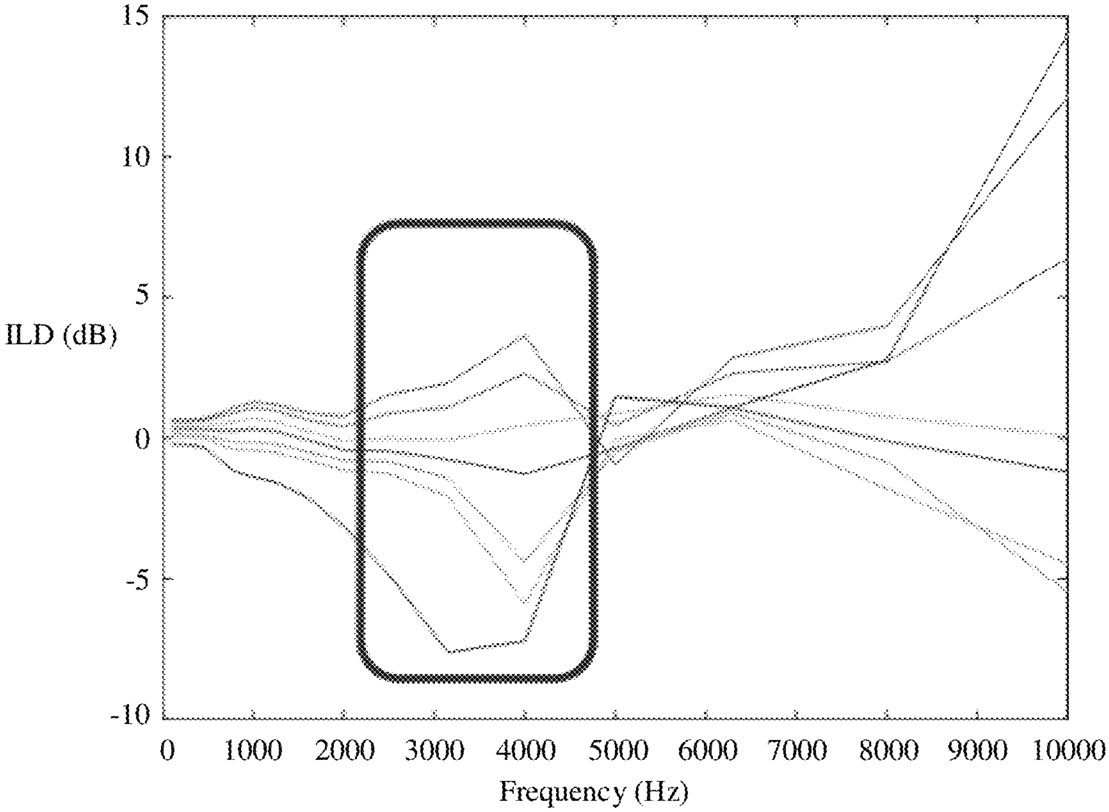
FIG. 12 is a schematic diagram of a relationship between a frequency and an ILD according to an embodiment of this application.

For example, FIG. 12 is a schematic diagram of a relationship between a frequency and an interaural level difference (interaural level difference, ILD) according to an embodiment of this application. A different line in FIG. 12 may be used to indicate impact imposed on an interaural level when there is a different distance between the left speaker and the right speaker. It may be understood that a frequency band that imposes relatively great impact on the interaural level difference may be a range such as [2000 Hz, 5000 Hz].

The second frequency band may be understood as a frequency band on which a human ear is most sensitive to loudness, or may be understood as a frequency band that imposes impact on a psychological level of the user. For example, a commonly used frequency band, for example, 1000 Hz-8000 Hz, in a full frequency band may be obtained, and a frequency band corresponding to a case in which a change rate of a sound pressure level (sound pressure level, SPL) meets a specific range (or is greater than a specific threshold) is obtained from the commonly used frequency band. The second frequency band may be $[k2_{low}, k2_{high}]$.

Figure 13:
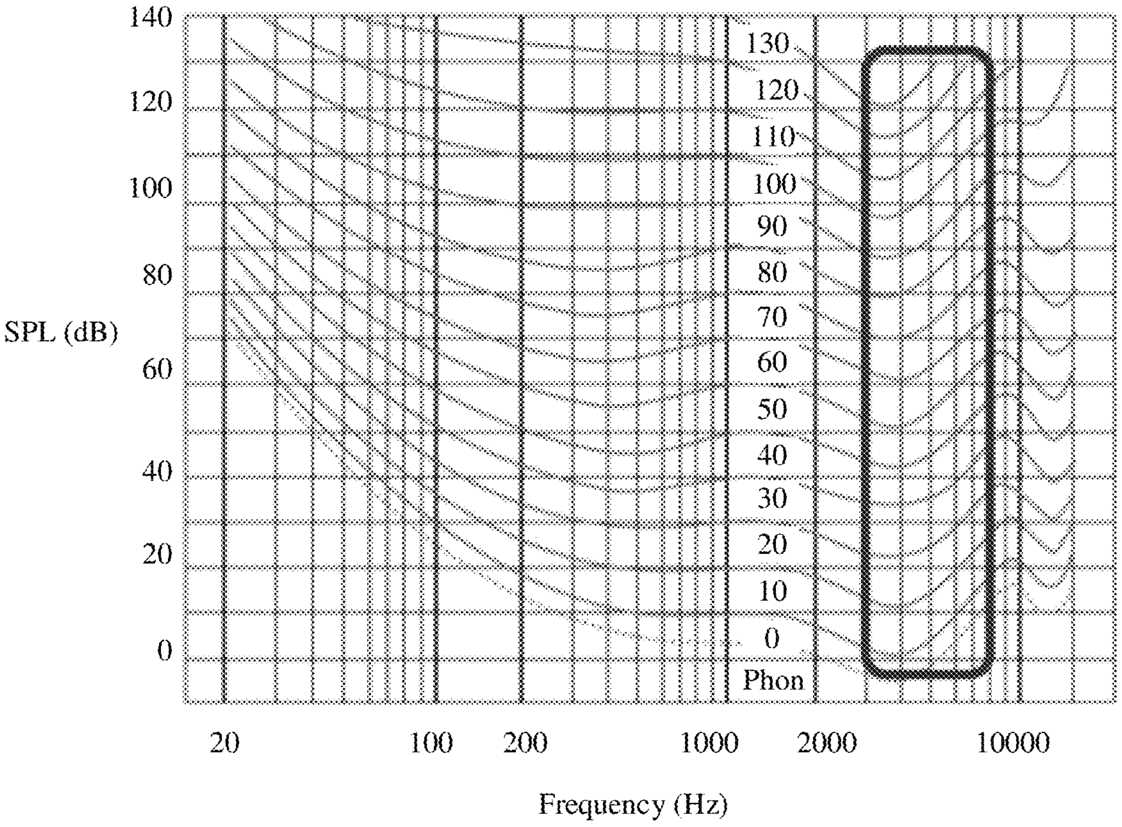
FIG. 13 is a schematic diagram of a relationship between a frequency domain and a sound pressure level according to an embodiment of this application.

For example, FIG. 13 is a schematic diagram of a relationship between a frequency domain and an SPL according to an embodiment of this application. As shown in FIG. 13, a frequency band most sensitive to the human ear may be a range such as [4000 Hz, 8000 Hz].

Further, the preset frequency band $[k_{low}, k_{high}]$ may be as follows:

$$[k_{low}, k_{high}] = [k1_{low}, k1_{high}] \cap [k2_{low}, k2_{high}] \quad \text{formula (16)}$$

For example, the preset frequency band may be a range such as [4000 Hz, 5000 Hz]. A value of the preset frequency band is not specifically limited in this embodiment of this application.

S1007: The terminal device adjusts a frequency response on the preset frequency band, to obtain the first target frequency response and the second target frequency response.

It may be understood that when a system function used to indicate the frequency response of the first play component is $E_{spkL}(k)$, a first frequency response compensation function $E_{spkL}^{-1}(k)$ of the first play component may be as follows:

$$E_{spkL}^{-1}(k) = \frac{1}{E_{spkL(k)}}\begin{pmatrix} k < k_{high} \\ k > k_{low} \end{pmatrix} \quad \text{formula (17)}$$

When a system function used to indicate the frequency response of the play component shown in the figure is $E_{spkR}(k)$, a second frequency response compensation function $E_{spkR}^{-1}(k)$ of the second play component may be as follows:

$$E_{spkR}^{-1}(k) = \frac{1}{E_{spkR(k)}}\begin{pmatrix} k < k_{high} \\ k > k_{low} \end{pmatrix} \quad \text{formula (18)}$$

Further, the terminal device corrects the frequency response of the first play component by using the first frequency response compensation function $E_{spkL}^{-1}(k)$ of the first play component obtained in S1007, to obtain the first target frequency response, and corrects the frequency response of the second play component by using the second frequency response compensation function $E_{spkR}^{-1}(k)$ of the second play component obtained in S1007, to obtain the second target frequency response.

It may be understood that on the preset frequency band, an amplitude corresponding to the first target frequency response meets a preset amplitude range, and an amplitude corresponding to the second target frequency response meets the preset amplitude range. The preset amplitude range may be a range such as [−1/1000 dB-1/1000 dB], or may be a range such as [−1/100 dB-1/100 dB]. This is not limited in this embodiment of this application.

It may be understood that the terminal device may correct the frequency response of the play component on the preset frequency band, to reduce complexity of an algorithm, and distort noise introduced in a frequency response correction process, so that a frequency response obtained after correction processing is more in line with a habit of using the speaker by the user.

Based on this, the terminal device may perform different processing on the frequency response of the play component based on a type of the play component, so that a speaker after frequency response correction can output an audio signal that better meets a user requirement.

It may be understood that the interfaces described in embodiments of this application are merely examples, and cannot constitute a limitation on embodiments of this application.

Figure 14:
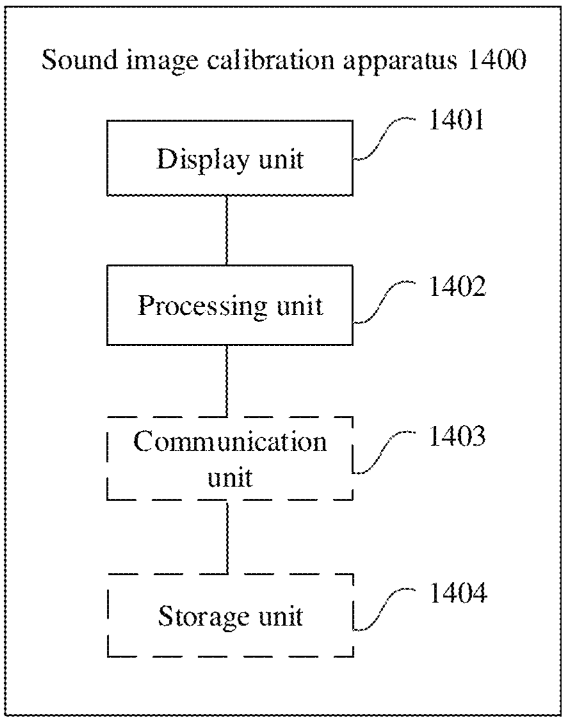
FIG. 14 is a schematic diagram of a structure of a sound image calibration apparatus according to an embodiment of this application.

The method provided in the embodiments of this application is described above with reference to FIG. 3-FIG. 13. An apparatus for performing the method provided in the embodiments of this application is described below. FIG. 14 is a schematic diagram of a structure of a sound image calibration apparatus according to an embodiment of this application. The sound image calibration apparatus may be the terminal device in the embodiments of this application, or may be a chip or a chip system in the terminal device.

As shown in FIG. 14, the sound image calibration apparatus 1400 may be used in a communication device, a circuit, a hardware component, or a chip, and the sound image calibration apparatus includes a display unit 1401 and a processing unit 1402. The display unit 1401 is configured to support the sound image calibration apparatus 1400 in performing a display step. The processing unit 1402 is configured to support the sound image calibration 1400 in performing an information processing step.

Specifically, this embodiment of this application provides the sound image calibration apparatus 1400. The terminal device includes a first play component and a second play component. The display unit 1401 is configured to display a first interface, where the first interface includes a first control used to play a target video. The processing unit 1402 is configured to receive a first operation performed on the first control. In response to the first operation, the display unit 1401 is configured to display a second interface, and the processing unit 1402 is further configured to: output a first target audio signal by using the first play component, and output a second target audio signal by using the second play component, where a sound image is located at a first location when the first target audio signal and the second target audio signal are played, and the second interface includes a second control used to enable sound image calibration. The processing unit 1402 is further configured to receive a second operation performed on the second control. In response to the second operation, the processing unit 1402 is further configured to: output a third target audio signal by using the first play component, and output a fourth target audio signal by using the second play component, where the sound image is located at a second location when the third target audio signal and the fourth target audio signal are played, and a distance between the second location and a central location of the terminal device is less than a distance between the first location and the central location.

In a possible implementation, the sound image calibration apparatus 1400 may further include a communication unit 1403. Specifically, the communication unit is configured to support the sound image calibration apparatus 1400 in performing steps of data sending and data receiving. The communication unit 1403 may be an input or output interface, a pin, a circuit, or the like.

In a possible embodiment, the sound image calibration apparatus may further include a storage unit 1404. The processing unit 1402 and the storage unit 1404 are connected to each other by using a line. The storage unit 1404 may include one or more memories, and the memory may be one or more components that are in a device or a circuit and that are configured to store a program or data. The storage unit 1404 may exist independently, and is connected to the processing unit 1402 included in the sound image calibration apparatus by using a communication line. Alternatively, the storage unit 1404 may be integrated into the processing unit 1402.

The storage unit 1404 may store computer-executable instructions of the method in the terminal device, so that the processing unit 1402 performs the method in the foregoing embodiments. The storage unit 1404 may be a register, a cache, a RAM, or the like, and the storage unit 1404 may be integrated into the processing unit 1402. The storage unit 1404 may be a read-only memory (read-only memory, ROM) or another type of static storage device that may store static information and instructions. The storage unit 1404 may be independent of the processing unit 1402.

Figure 15:
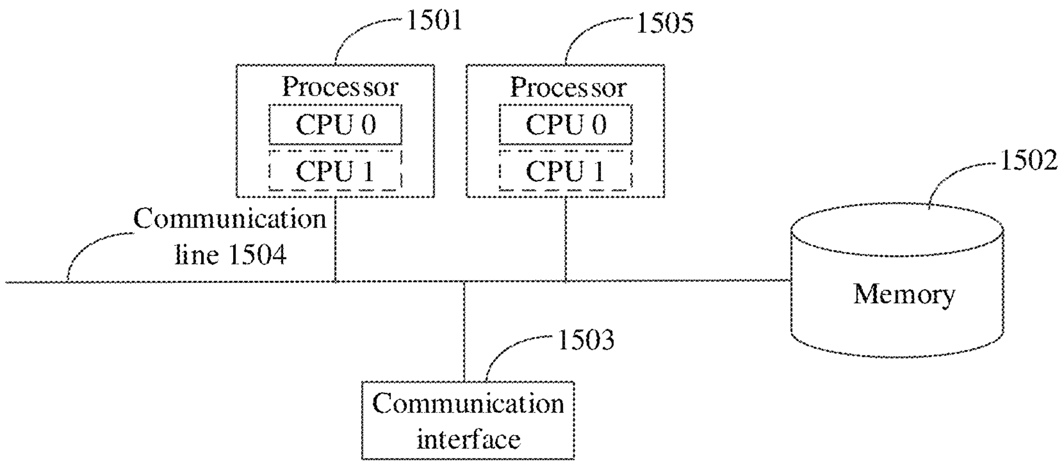
FIG. 15 is a schematic diagram of a hardware structure of another terminal device according to an embodiment of this application.

FIG. 15 is a schematic diagram of a hardware structure of another terminal device according to an embodiment of this application. As shown in FIG. 15, the terminal device includes a processor 1501, a communication line 1504, and at least one communication interface (a communication interface 1503 is used as an example for description in FIG. 15).

The processor 1501 may be a general-purpose central processing unit (central processing unit, CPU), a microprocessor, an application-specific integrated circuit (application-specific integrated circuit, ASIC), or one or more integrated circuits configured to control program execution in the solutions in this application.

The communication line 1504 may include a circuit for transmitting information between the foregoing components.

The communication interface 1503 uses any apparatus such as a transceiver and is configured to communicate with another device or a communication network, such as an Ethernet or a wireless local area network (wireless local area networks, WLAN).

Possibly, the terminal device may further include a memory 1502.

The memory 1502 may be a read-only memory (read-only memory, ROM) or another type of static storage device that can store static information and instructions, a random access memory (random access memory, RAM) or another type of dynamic storage device that can store information and instructions, or an electrically erasable programmable read-only memory (electrically erasable programmable read-only memory, EEPROM), a compact disc read-only memory (compact disc read-only memory, CD-ROM) or another optical disc memory, a compact disc memory (including a compact disc, a laser disc, an optical disc, a digital versatile disc, a Blu-ray disc, and the like), a magnetic disk storage medium or another magnetic storage device, or any other medium that can be used to carry or store desired program code in a form of instructions or data structures and that can be accessed by a computer, but is not limited thereto. The memory may exist independently, and is connected to the processor by using the communication line 1504. The memory may alternatively be integrated into the processor.

The memory 1502 is configured to store computer-executable instructions for performing the solutions in this application, and the processor 1501 controls execution. The processor 1501 is configured to execute the computer-executable instructions stored in the memory 1502, to implement the method provided in the embodiments of this application.

Possibly, the computer-executable instructions in this embodiment of this application may also be referred to as application program code. This is not specifically limited in this embodiment of this application.

During specific implementation, in an embodiment, the processor 1501 may include one or more CPUs, for example, a CPU 0 and a CPU 1 in FIG. 15.

During specific implementation, in an embodiment, the terminal device may include a plurality of processors, such as a processor 1501 and a processor 1505 in FIG. 15. Each of these processors may be a single-core (single-CPU) processor or a multi-core (multi-CPU) processor. The processor herein may be one or more devices, circuits, and/or processing cores configured to process data (for example, computer program instructions).

A computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) manner or a wireless (for example, infrared, radio, or microwave) manner. The computer-readable storage medium may be any available medium that the computer can perform storage, or a data storage device such as a server or a data center integrating one or more available media. For example, the available medium may include a magnetic medium (for example, a floppy disk, a hard disk, or a magnetic tape), an optical medium (for example, a digital versatile disc (digital versatile disc, DVD)), a semiconductor medium (for example, a solid state disk (solid state disk, SSD)), or the like.

An embodiment of this application further provides a computer-readable storage medium. All or some of the methods described in the foregoing embodiments may be implemented by using software, hardware, firmware, or any combination thereof. The computer-readable medium may include a computer storage medium and a communication medium, and may further include any medium that enables a computer program to be transmitted from a place to another place. The storage medium may be any target medium accessible to the computer.

In a possible design, the computer-readable medium may include a compact disc read-only memory (compact disc read-only memory, CD-ROM), a RAM, a ROM, an EEPROM, or another optical disc memory; or the computer-readable medium may include a magnetic disk memory or another magnetic disk storage device. In addition, any connection line may also be appropriately referred to as a computer-readable medium. For example, if software is transmitted from a website, a server, or another remote source by using a coaxial cable, an optical fiber cable, a twisted pair, a DSL, or wireless technologies (for example, infrared, radio, and microwave), the coaxial cable, the optical fiber cable, the twisted pair, the DSL, or the wireless technologies such as infrared, radio, and microwave are included in the definition of the medium. As used herein, a magnetic disk and an optical disc include a compact disc (CD), a laser disc, an optical disc, a digital versatile disc (digital versatile disc, DVD), a floppy disk, and a Blu-ray disc. The magnetic disk usually reproduces data in a magnetic manner, and the optical disc reproduces data optically by using laser.

A combination of the foregoing should also be included in the scope of the computer-readable medium. The foregoing descriptions are merely specific implementations of the present invention. However, the protection scope of the present invention is not limited thereto. Any change or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A sound image calibration method, applied to a terminal device, wherein the terminal device comprises a first play component and a second play component that are asymmetrically disposed, and the method comprises:

obtaining a first target frequency response corresponding to the first play component and a second target frequency response corresponding to the second play component; and playing, by the first play component, a first audio signal in a video by using the first target frequency response, and playing, by the second play component, a second audio signal in the video by using the second target frequency response, when the terminal device plays the video, wherein a sound image generated after the first audio signal and the second audio signal are superposed is located at a first location, and a distance between the first location and a central location of the terminal device is less than a preset value.

2. The method according to claim 1, wherein the method further comprises:

obtaining, by the terminal device, a first initial frequency response of the first play component and a second initial frequency response of the second play component;

correcting, by the terminal device, the first initial frequency response to obtain the first target frequency response; and correcting, by the terminal device, the second initial frequency response to obtain the second target frequency response.

3. The method according to claim 2, wherein the correcting, by the terminal device, the first initial frequency response to obtain the first target frequency response; and correcting, by the terminal device, the second initial frequency response to obtain the second target frequency response comprises:

obtaining, by the terminal device, a first frequency response compensation function corresponding to the first initial frequency response and a second frequency response compensation function corresponding to the second initial frequency response; and correcting, by the terminal device, the first initial frequency response on a preset frequency band by using the first frequency response compensation function, to obtain the first target frequency response; and correcting the second initial frequency response on the preset frequency band by using the second frequency response compensation function, to obtain the second target frequency response.

4. The method according to claim 3, wherein the preset frequency band is a frequency band greater than a target cutoff frequency in a full frequency band; or the preset frequency band is a same frequency band between a first frequency band and a second frequency band, the first frequency band is a frequency band corresponding to a case in which a change rate of an interaural level difference ILD meets a first target range, and the second frequency band is a frequency band corresponding to a case in which a change rate of a sound pressure level SPL meets a second target range.

5. The method according to claim 4, wherein that the preset frequency band is a frequency band greater than a target cutoff frequency in a full frequency band comprises: when the first play component or the second play component comprises a target component, the preset frequency band is a frequency band greater than the target cutoff frequency in the full frequency band, wherein the target cutoff frequency is a cutoff frequency of the target component; or that the preset frequency band is a same frequency band between a first frequency band and a second frequency band comprises: when the first play component or the second play component does not comprise the target component, the preset frequency band is a same frequency band between the first frequency band and the second frequency band.

6. The method according to claim 1, wherein the playing, by the first play component, a first audio signal in a video by using the first target frequency response, and playing, by the second play component, a second audio signal in the video by using the second target frequency response, when the terminal device plays the video comprises:

outputting, by the terminal device, a first target audio signal by using the first target frequency response, and outputting a second target audio signal by using the second target frequency response;

on a target frequency band, obtaining, by the terminal device, a first playback signal corresponding to a first sweep signal by using the first target frequency response, and obtaining a second playback signal corresponding to the first sweep signal by using the second target frequency response, wherein the target frequency band is a frequency band on which a similarity between the first target frequency response and the second target frequency response is greater than a preset threshold, the first sweep signal has a same amplitude, and a frequency band of the first sweep signal meets the target frequency band; and processing, by the terminal device, the first target audio signal and/or the second target audio signal based on a difference between the first playback signal and the second playback signal, to obtain the first audio signal and the second audio signal.

7. The method according to claim 6, wherein the processing, by the terminal device, the first target audio signal and/or the second target audio signal based on a difference between the first playback signal and the second playback signal, to obtain the first audio signal and the second audio signal comprises:

processing, by the terminal device, the first target audio signal and/or the second target audio signal based on the difference between the first playback signal and the second playback signal, to obtain a third target audio signal and a fourth target audio signal; and processing, by the terminal device, the third target audio signal by using a first head-related transfer function HRTF in a target HRTF, to obtain the first audio signal, and processing the fourth target audio signal by using a second HRTF in the HRTF, to obtain the second audio signal.

8. The method according to claim 7, wherein the processing, by the terminal device, the third target audio signal by using a first head-related transfer function HRTF in a target HRTF, to obtain the first audio signal, and processing the fourth target audio signal by using a second HRTF in the HRTF, to obtain the second audio signal comprises:

obtaining, by the terminal device, the target HRTF;

processing, by the terminal device, the third target audio signal by using the first HRTF in the target HRTF, to obtain a fifth target audio signal, and processing the fourth target audio signal by using the second HRTF corresponding to the first HRTF in the target HRTF, to obtain a sixth target audio signal; and performing, by the terminal device, tone processing on the fifth target audio signal by using a target filtering parameter, to obtain the first audio signal, and performing tone processing on the sixth target audio signal by using the target filtering parameter, to obtain the second audio signal.

9. The method according to claim 8, wherein the second interface further comprises a control used to adjust a tone, and the method further comprises:

receiving, by the terminal device, an operation of selecting a target tone by a user; and in response to the operation, performing, by the terminal device, tone processing on the fifth target audio signal by using a target filtering parameter corresponding to the target tone, to obtain the first audio signal, and performing tone processing on the sixth target audio signal by using the target filtering parameter, to obtain the second audio signal.

10. The method according to claim 9, wherein the performing, by the terminal device, tone processing on the fifth target audio signal by using a target filtering parameter, to obtain the first audio signal, and performing tone processing on the sixth target audio signal by using the target filtering parameter, to obtain the second audio signal comprises:

performing, by the terminal device, tone processing on the fifth target audio signal by using the target filtering parameter, to obtain a seventh target audio signal, and performing tone processing on the sixth target audio signal by using the target filtering parameter, to obtain an eighth target audio signal; and performing, by the terminal device, volume adjustment on the seventh target audio signal based on a gain change between an initial audio signal corresponding to the first play component and an initial audio signal corresponding to the second play component and a gain change between the seventh target audio signal and the eighth target audio signal, to obtain the first audio signal, and performing, by the terminal device, volume adjustment on the eighth target audio signal based on the gain change between the initial audio signal corresponding to the first play component and the initial audio signal corresponding to the second play component and the gain change between the seventh target audio signal and the eighth target audio signal, to obtain the second audio signal.

11. A terminal device, comprising a memory, a processor, and a computer program stored in the memory and capable of running on the processor, wherein the terminal device comprises a first play component and a second play component that are asymmetrically disposed, and when the processor executes the computer program, the terminal device is enabled to perform the following operations:

obtaining a first target frequency response corresponding to the first play component and a second target frequency response corresponding to the second play component; and playing, by the first play component, a first audio signal in a video by using the first target frequency response, and playing, by the second play component, a second audio signal in the video by using the second target frequency response, when the terminal device plays the video, wherein a sound image generated after the first audio signal and the second audio signal are superposed is located at a first location, and a distance between the first location and a central location of the terminal device is less than a preset value.

12. The terminal device according to claim 11, wherein the method further comprises:

obtaining, by the terminal device, a first initial frequency response of the first play component and a second initial frequency response of the second play component;

correcting, by the terminal device, the first initial frequency response to obtain the first target frequency response; and correcting, by the terminal device, the second initial frequency response to obtain the second target frequency response.

13. The terminal device according to claim 12, wherein the correcting, by the terminal device, the first initial frequency response to obtain the first target frequency response; and correcting, by the terminal device, the second initial frequency response to obtain the second target frequency response comprises:

obtaining, by the terminal device, a first frequency response compensation function corresponding to the first initial frequency response and a second frequency response compensation function corresponding to the second initial frequency response; and correcting, by the terminal device, the first initial frequency response on a preset frequency band by using the first frequency response compensation function, to obtain the first target frequency response; and correcting the second initial frequency response on the preset frequency band by using the second frequency response compensation function, to obtain the second target frequency response.

14. The terminal device according to claim 13, wherein the preset frequency band is a frequency band greater than a target cutoff frequency in a full frequency band; or the preset frequency band is a same frequency band between a first frequency band and a second frequency band, the first frequency band is a frequency band corresponding to a case in which a change rate of an interaural level difference ILD meets a first target range, and the second frequency band is a frequency band corresponding to a case in which a change rate of a sound pressure level SPL meets a second target range.

15. The terminal device according to claim 14, wherein that the preset frequency band is a frequency band greater than a target cutoff frequency in a full frequency band comprises: when the first play component or the second play component comprises a target component, the preset frequency band is a frequency band greater than the target cutoff frequency in the full frequency band, wherein the target cutoff frequency is a cutoff frequency of the target component; or that the preset frequency band is a same frequency band between a first frequency band and a second frequency band comprises: when the first play component or the second play component does not comprise the target component, the preset frequency band is a same frequency band between the first frequency band and the second frequency band.

16. The terminal device according to claim 15, wherein the playing, by the first play component, a first audio signal in a video by using the first target frequency response, and playing, by the second play component, a second audio signal in the video by using the second target frequency response, when the terminal device plays the video comprises:

outputting, by the terminal device, a first target audio signal by using the first target frequency response, and outputting a second target audio signal by using the second target frequency response;

on a target frequency band, obtaining, by the terminal device, a first playback signal corresponding to a first sweep signal by using the first target frequency response, and obtaining a second playback signal corresponding to the first sweep signal by using the second target frequency response, wherein the target frequency band is a frequency band on which a similarity between the first target frequency response and the second target frequency response is greater than a preset threshold, the first sweep signal has a same amplitude, and a frequency band of the first sweep signal meets the target frequency band; and processing, by the terminal device, the first target audio signal and/or the second target audio signal based on a difference between the first playback signal and the second playback signal, to obtain the first audio signal and the second audio signal.

17. The terminal device according to claim 11, wherein the terminal device further comprises a flexible screen.

18. The terminal device according to claim 11, wherein the first play component is a speaker or a receiver, and the second play component is a speaker or a receiver.

19. The terminal device according to claim 11, wherein the terminal device further comprises a third play component, and the first play component, the second play component, and the third play component are asymmetrically disposed.

20. A non-transitory computer-readable storage medium, wherein the non-transitory computer-readable storage medium stores a computer program, and when the computer program is executed by a terminal device, the terminal device comprises a first play component and a second play component that are asymmetrically disposed, and is enabled to perform the following operations:

obtaining a first target frequency response corresponding to the first play component and a second target frequency response corresponding to the second play component; and playing, by the first play component, a first audio signal in a video by using the first target frequency response, and playing, by the second play component, a second audio signal in the video by using the second target frequency response, when the terminal device plays the video, wherein a sound image generated after the first audio signal and the second audio signal are superposed is located at a first location, and a distance between the first location and a central location of the terminal device is less than a preset value.

* * * * *